United States Patent
Kakizaki et al.

[19]

[11] Patent Number: 6,161,530
[45] Date of Patent: Dec. 19, 2000

[54] CONTROL SYSTEM FOR INTERNAL COMBUSTION ENGINE

[75] Inventors: Shigeaki Kakizaki; Mikio Matsumoto; Hiraku Ooba, all of Yokohama, Japan

[73] Assignee: Nissan Motor Co., Ltd., Yokohama, Japan

[21] Appl. No.: 09/109,044

[22] Filed: Jul. 2, 1998

[30] Foreign Application Priority Data

Jul. 4, 1997 [JP] Japan ................................ 9-179648
Aug. 1, 1997 [JP] Japan ................................ 9-207914

[51] Int. Cl.$^7$ .................................................. F02D 41/00
[52] U.S. Cl. ................................... 123/674; 701/109
[58] Field of Search ......................... 123/674; 701/109

[56] References Cited

U.S. PATENT DOCUMENTS

| | | | |
|---|---|---|---|
| 5,048,493 | 9/1991 | Orzel et al. | 123/674 |
| 5,099,817 | 3/1992 | Nakaniwa | 123/674 |
| 5,255,662 | 10/1993 | Nakajima | 123/674 |
| 5,381,774 | 1/1995 | Nakajima | 123/674 |
| 5,701,871 | 12/1997 | Munakata et al. | 123/674 |
| 5,762,053 | 6/1998 | Anamoto | 123/674 |
| 5,816,230 | 10/1998 | Kurokawa et al. | 123/674 |
| 5,921,226 | 7/1999 | Toyohara et al. | 123/674 |
| 5,950,606 | 9/1999 | Iida et al. | 123/674 |
| 5,960,765 | 10/1999 | Iida et al. | 123/295 |
| 5,964,208 | 10/1999 | Yamashita et al. | 123/674 |

FOREIGN PATENT DOCUMENTS

| | | |
|---|---|---|
| 0 488 254 | 6/1992 | European Pat. Off. . |
| 0 848 156 | 6/1998 | European Pat. Off. . |
| WO96/36802 | 11/1996 | WIPO . |

OTHER PUBLICATIONS

Patent Abstracts of Japan, vol. 1997, No. 06, Jun. 30, 1997 (JP 09–042011, Feb. 10, 1997).

Patent Abstracts of Japan, vol. 1998, No. 06, Apr. 30, 1998 (JP 10–054310, Feb. 24, 1998).

*Primary Examiner*—John Kwon
*Attorney, Agent, or Firm*—Foley & Lardner

[57] ABSTRACT

An air-fuel ratio control system for an automotive internal combustion engine equipped with a fuel injector valve. The control system comprises a sensor for detecting a ratio between air and fuel which form air-fuel mixture in the engine. A controller is provided to control the ratio between air and fuel, and includes a section for calculating the ratio between air and fuel, in accordance with an engine operating condition. A section is provided for calculating a quantity of fuel to be supplied through the fuel injector valve, in accordance with the calculated ratio between air and fuel. A section is provided for calculating a coefficient relating to a feedback control for the ratio between air and fuel, in accordance with the calculated quantity of fuel to be supplied. The feedback control is made in accordance with the ratio between air and fuel detected by the sensor. Additionally, a section is provided for accomplishing a feedback in calculation of the ratio between air and fuel, by using the calculated coefficient.

18 Claims, 14 Drawing Sheets

GENERAL FROM OF TEVP MAP

CONTROL SYSTEM FOR INTERNAL COMBUSTION ENGINE

The contents of Japanese Patent Applications No. 9-179648 and No. 9-207914, with filing dates of Jul. 4, 1997 and Aug. 1, 1997 in Japan, are hereby incorporated by reference.

BACKGROUND OF THE INVENTION

1. Field of the Invention

This invention relates to improvements in a control system for an internal combustion engine, provided with learning function, and more particularly to the improvements in an air-fuel ratio control system provided with learning function, for the internal combustion engine which is operated in such a manner that a plurality of combustion conditions in each cylinder are changed over from one to another.

2. Description of the Prior Art

Most automotive vehicle engines are equipped with an air-fuel ratio control system for controlling air-fuel ratio of air-fuel mixture to be supplied to the engine at a target value. It has been hitherto proposed to provide learning function to the air-fuel ratio control system, as disclosed in Japanese Patent Provisional Publication No. 5-156994. This air-fuel ratio control system is arranged as follows: Actual air-ratio of air-fuel mixture is judged whether to fall within a rich side or within a lean side relative to a target air-fuel ratio (for example, stoichiometric air-fuel ratio) by comparing an output value of an oxygen sensor disposed in an exhaust system with a slice level (corresponding to the target air-fuel ratio). In accordance with the result of this judgment, an air-fuel ratio feedback correction coefficient $\alpha$ is set to increase or decrease under proportional-plus-integral control and the like. Then, a basic fuel injection quantity Tp is corrected with the air-fuel ratio feedback correction coefficient $\alpha$ thereby omitting the deviation of actual air-fuel ratio from the target air-fuel ratio which deviation is owing to error of component parts, deterioration with time lapse, circumferential change and the like. The basic fuel injection quantity Tp is calculated in accordance with an intake air (flow) quantity detected by an airflow meter, and an engine speed of the engine.

The learning function is configured as follows: A deviation of the air-fuel ratio feedback correction coefficient $\alpha$ from a standard value (a converged target value) is updated and stored as a learning value PHOS in each of a plurality of learning regions (or engine operating regions) in a learning map which leaning regions correspond to the respective engine operating regions or ranges. The basic fuel injection quantity Tp is corrected with the leaning value PHOS thereby approximately coinciding a basic air-fuel ratio (to be obtained without the air-fuel ratio feedback correction coefficient $\alpha$) with the target air-fuel ratio. This promotes convergence of actual air-fuel ratio to the target air-fuel ratio in the air-fuel ratio feedback control. In other words, by utilizing the learning function in combination with air-fuel ratio feedback control, correction requirements (for the fuel injection quantity) different depending upon engine operating conditions can be met at a high response so as to effectively control actual air-fuel ratio around the target air-fuel ratio.

Furthermore, another Japanese Patent Application First Publication No. Heisei 5-202816 (published on Aug. 10, 1993) exemplifies a previously proposed control system for performing a learning control over an air-fuel mixture ratio (also called, the air-fuel (A/F) ratio) in the internal combustion engine in which a purge processor for purging an evaporated (vaporized) fuel in a fuel tank into an intake air system of the engine under a predetermined engine driving condition.

In the previously proposed control system, the learning on the air-fuel ratio is carried out independently of an execution or no execution of the purge of the vaporized fuel through the purge processor during a homogeneous charge combustion in the stoichiometric air-fuel mixture ratio control.

SUMMARY OF THE INVENTION

In the above-discussed conventional air-fuel control system with the learning function, the learning map which is stored with the leaning values PHOS for the respective engine operating ranges is arranged to have abscissa for engine speed Ne and ordinate (or load axis) for the basic fuel injection quantity Tp (=intake air (flow) quantity to be charged in the cylinder) during engine operation around stoichiometric air-fuel ratio. As a result, there is the possibility of the following shortcomings arising, for example, in case that engine operation is changed over from a first mode engine operation (combustion condition) around stoichiometric air-fuel ratio ($\lambda$=1) to a second mode engine operation (combustion condition) at a lean air-fuel ratio, and vice versa: During the first mode engine operation, the air-fuel ratio feedback control is made in accordance with the output of the oxygen sensor as discussed above while the learning value PHOS is being updated and stored. During the second mode engine operation, the basic fuel injection quantity Tp is corrected with the learning value PHOS which has been updated and stored during the first mode engine operation, upon searching or referring the map, thus accomplishing an open loop control. The second mode engine operation includes engine operation at lean air-fuel ratio under each of so-called homogeneous charge combustion and stratified charge combustion in a cylinder direct injection spark-ignition internal combustion engine in which fuel is directly injected into each cylinder of the engine.

In view of the fact that, during the second mode engine operation, the basic fuel injection quantity Tp is corrected with the learning value PHOS which has been updated and stored during the first mode engine operation, there arises the fear that the learning region to be referred to for the second mode engine operation does not necessarily correspond to the learning region formed during the first mode engine operation in accordance with the basic fuel injection quantity Tp. This depends on the fact the basic fuel injection quantity Tp increases as air-fuel ratio becoming leaner, because the opening degree of a throttle valve is compulsorily increased to increase the intake air quantity (=the basic fuel injection quantity Tp) during the second mode engine operation. As a result, during the second mode engine operation, the learning value PHOS which is actually referred to depends on the basic fuel injection quantity Tp which has been increased upon air-fuel ratio becoming leaner, although the operating point (or actual fuel injection quantity) of a fuel device (or the fuel injector value) is generally equal to that during the first mode engine operation. Thus, it will be understood that such learning value PHOS actually referred to should not be referred to for the second mode engine operation. This may lower precision in air-fuel ratio control during the second mode engine operation at the lean air-fuel ratio.

Besides, in order to avoid the above shortcomings, it may be proposed to newly and separately provide learning regions corresponding to the second mode engine operation. However, the possibility of learning being made in these newly provided learning regions is low during the first mode engine operation, and therefore it is impossible to meet a condition ("the learning value PHOS is updated and stored after engine starting") required for transition from the first mode engine operation to the second mode engine operation. As a result, there arises the fear that the transition from the first mode engine operation to the second mode engine operation becomes impossible.

Furthermore, it may be proposed to extend each learning region (single unit) for the first mode engine operation so as to contain a region corresponding to the second mode engine operation. However, this provides the possibility of lowering precision in learning itself and therefore provides the fear of lowering precision in the open loop control during the second mode engine operation in which air-fuel ratio control is made upon referring to such a low precision learning result.

In view of the above, an object of the present invention is to provide an improved air-fuel ratio control system for an internal combustion engine and an improved internal combustion engine, which can overcome drawbacks encountered in conventional air-fuel ratio control systems for an internal combustion engine.

Another object of the present invention is to provide an improved air-fuel ratio control system for an internal combustion engine in which engine operation is changed over from a first mode engine operation at stoichiometric air-fuel ratio to a second mode engine operation at lean air-fuel ratio, which control system can effectively accomplish learning control and air-fuel ratio control for the engine at a high precision, maintaining chances of learning, even though the control system has a simple configuration.

A further object of the present invention is to provide an improved air-fuel ratio control system for an internal combustion engine in which engine operation is changed over from a first mode engine operation at stoichiometric air-fuel ratio to a second mode engine operation at lean air-fuel ratio, in which air-fuel ratio feedback control under learning function can be achieved at a high control precision throughout the whole engine operating ranges maintaining learning chances, while making it possible to accomplish an open loop control of air-fuel ratio at a high precision upon using the result of learning even though the configuration of the control system is simple in configuration.

A still further object of the present invention is to provide the improved internal combustion engine which can assure a stable combustion of air mixture fuel even in a stratified charge combustion with a lean air-fuel mixture ratio, processing a purge of a vaporized fuel through a purge processor with which the engine is provided.

A first aspect of the present invention resides in acontrol system for an internal combustion engine, comprising a section for making changeover among a plurality of combustion conditions in the engine. A section is provided for calculating a fuel supply quantity of fuel to be supplied to the engine.

A section is provided for give a coefficient relating to a feedback control for a ratio between air and fuel which forms air-fuel mixture in the engine, in accordance with the fuel supply quantity calculated by the fuel supply quantity calculating section. A section is provided for accomplishing the feedback control for the ratio between air and fuel, in accordance with the coefficient during one of the plurality of combustion conditions.

A second aspect of the present invention resides in a control system for an internal combustion engine, comprising a sensor for detecting a ratio between air and fuel which form air-fuel mixture in the engine. A device is provided for supplying fuel into a cylinder of the engine. A device is provided for introducing air into the cylinder. A section is provided for calculating the ratio between air and fuel, in accordance with an engine operating condition. A section is provided for calculating a quantity of fuel to be supplied through the fuel supplying device, in accordance with the calculated ratio between air and fuel. A section is provided for calculating a coefficient relating to a feedback control for the ratio between air and fuel, in accordance with the calculated quantity of fuel to be supplied, the feedback control being in accordance with the ratio between air and fuel detected by the sensor. A section is provided for accomplishing a feedback in calculation of the ratio between air and fuel, by using the calculated coefficient.

A third aspect of the present invention resides in a control system for an internal combustion engine, comprising a first air-fuel ratio control system for controlling an air-fuel ratio of air-fuel mixture to be formed in the engine during a first mode engine operation around stoichiometric air-fuel ratio. The first air-fuel ratio control system includes a basic fuel supply quantity calculating section for calculating a basic fuel supply quantity in accordance with an intake air quantity of air to be charged in a cylinder of the engine. An air-fuel ratio detecting section is provided for detecting an air-fuel ratio by providing first and second value signals which correspond respectively to rich and lean air-fuel ratios of the air-fuel mixture to be formed in the engine, relative to stoichiometric air-fuel ratio. An air-fuel ratio feedback correction value setting section is provided for setting an air-fuel ratio feedback correction value in accordance with the air-fuel ratio detected by the air-fuel ratio detecting section, the air-fuel ratio feedback correction value being for correcting the basic fuel supply quantity to cause an actual air-fuel ratio to approach vicinity of stoichiometric air-fuel ratio. An air-fuel ratio correction learning value storing section is provided for storing an air-fuel ratio correction learning value to be changeable in each of a plurality of engine operating regions which are formed by dividing an operating range of the engine in accordance with a fuel supply quantity of fuel to be supplied to the engine, the air-fuel ratio correction learning value being for correcting the basic fuel supply quantity. An air-fuel ratio learning section is provided for learning the air-fuel ratio by updating and setting the air-fuel ratio correction learning value stored by the air-fuel ratio correction learning value storing section, for each engine operating region in a manner to decrease a deviation of the air-fuel ratio correction learning value from a standard value of the air-fuel ratio feedback correction value corresponding to the engine operating region. A fuel supply quantity setting section is provided for setting a final value of the fuel supply quantity for the first mode engine operation in accordance with the basic fuel supply quantity, the air-fuel ratio feedback correction value and the air-fuel ratio correction learning value. Additionally, a driving section is provided for driving a fuel supply device in accordance with the final value of the fuel supply quantity for the first mode engine operation set by the fuel supply quantity setting section.

The control system of the third aspect further comprises a second air-fuel ratio control system for controlling the air-fuel ratio during a second mode engine operation at lean air-fuel ratio. The second air-fuel ratio control system includes a fuel supply quantity calculating section for the second mode engine operation is provided for calculating the fuel supply quantity under the second mode engine operation, in accordance with the intake air quantity to be charged into the cylinder, and a target air-fuel ratio. A learning value searching section is provided, for searching the air-fuel ratio correction learning value storing section through the fuel supply quantity for the second mode engine operation to obtain the air-fuel ratio correction learning value. A fuel supply quantity setting section for the second mode engine operation is provided for setting a final value of the fuel supply quantity for the second mode engine operation in accordance with the air-fuel ratio correction learning value obtained by the learning value searching section and the fuel supply quantity for the second mode engine operation. Additionally, a driving section is provided for driving the fuel supply device in accordance with the final value of the fuel supply quantity set by the fuel supply quantity setting section for the second mode engine operation.

A fourth aspect of the present invention resides in a method of controlling an internal combustion engine. The method comprises the following steps: (a) making changeover among a plurality of combustion conditions in the engine; (b) calculating a fuel supply quantity of fuel to be supplied to the engine; (c) providing a coefficient relating to a feedback control for a ratio between air and fuel which form air-fuel mixture in the engine, in accordance with the fuel supply quantity calculated by the fuel supply quantity calculating section; and (d) accomplishing the feedback control for the ratio between air and fuel, in accordance with the coefficient during one of the plurality of combustion conditions.

A fifth aspect of the present invention resides in a method of controlling an internal combustion engine. The method comprises the following steps: (a) detecting a ratio between air and fuel which form air-fuel mixture in the engine; (b) supplying fuel into a cylinder of the engine; (c) introducing air into the cylinder; (d) calculating the ratio between air and fuel, in accordance with an engine operating condition; (e) calculating a quantity of fuel to be supplied into the cylinder, in accordance with the calculated ratio between air and fuel; (f) calculating a coefficient relating to a feedback control for the ratio between air and fuel, in accordance with the calculated quantity of fuel to be supplied, the feedback control being in accordance with the ratio between air and fuel detected by the sensor; and (g) accomplishing a feedback in calculation of the ratio between air and fuel, by using the calculated coefficient.

A sixth aspect of the present invention resides in a method of controlling an internal combustion engine. The method comprises a first air-fuel ratio control process for controlling an air-fuel ratio of air-fuel mixture to be formed in the engine, during a first mode engine operation around stoichiometric air-fuel ratio. The first air-fuel ratio control process includes the following steps: (a) calculating a basic fuel supply quantity in accordance with an intake air quantity of air to be charged in a cylinder of the engine; (b) detecting an air-fuel ratio by providing first and second value signals which correspond respectively to rich and lean air-fuel ratios of the air-fuel mixture to be formed in the engine, relative to stoichiometric air-fuel ratio; (c) setting an air-fuel ratio feedback correction value in accordance with the detected air-fuel ratio, the air-fuel ratio feedback correction value being for correcting the basic fuel supply quantity to cause an actual air-fuel ratio to approach vicinity of stoichiometric air-fuel ratio; (d) storing an air-fuel ratio correction learning value to be changeable in each of a plurality of engine operating regions which are formed by dividing an operating range of the engine in accordance with fuel supply quantity of fuel to be supplied to the engine, the air-fuel ratio correction learning value being for correcting the basic fuel supply quantity; (e) learning the air-fuel ratio by updating and setting the air-fuel ratio correction learning value stored by the air-fuel ratio correction learning value storing section, for each engine operating region in a manner to decrease a deviation of the air-fuel ratio correction learning value from a standard value of the air-fuel ratio feedback correction value corresponding to the engine operating region; (f) setting a final value of the fuel supply quantity for the first mode engine operation in accordance with the basic fuel supply quantity, the air-fuel ratio feedback correction value and the air-fuel ratio correction learning value; and (g) driving a fuel supply device in accordance with the set final value of the fuel supply quantity for the first mode engine operation.

The method of the sixth aspect further comprises a second air-fuel ratio control process for controlling the air-fuel ratio during a second mode engine operation at lean air-fuel ratio. The second air-fuel ratio control process includes the following steps: (h) calculating the fuel supply quantity under the second mode engine operation, in accordance with the intake air quantity to be charged into the cylinder, and a target air-fuel ratio; (i) searching the air-fuel ratio correction learning value storing section through the fuel supply quantity for the second mode engine operation to obtain the air-fuel ratio correction learning value; (j) setting a final value of the fuel supply quantity for the second mode engine operation in accordance with the obtained air-fuel ratio correction learning value and the fuel supply quantity for the second mode engine operation; and (k) driving the fuel supply device in accordance with the set final value of the fuel supply quantity for the second mode engine operation.

A seventh aspect of the present invention resides in an internal combustion engine, comprising: a combustion condition switching section for switching a combustion condition of the engine into any one of a plurality of combustion conditions according to an engine driving condition, the plurality of combustion conditions being a stratified lean air-fuel mixture ratio charge combustion, a homogeneous lean air-fuel mixture charge combustion, and a homogeneous stoichiometric air-fuel mixture ratio charge combustion in which an air-fuel mixture ratio is feedback controlled so as to render the air-fuel mixture ratio approach to the stoichiometric air-fuel mixture ratio; a purge section for purging a vaporized fuel into an intake air system of the engine under a predetermined engine driving condition; a presence-or-absence-of-purge dependent learning section for learning an air-fuel mixture ratio feedback coefficient separately from the same according to an execution or no execution of the purge of the vaporized fuel through the purge section when the combustion condition is switched into the homogeneous stoichiometric air-fuel mixture ratio charge combustion and for deriving each learning value on a fuel supply quantity to the engine such that the air-fuel mixture ratio feedback correction coefficient is maintained in a vicinity to a reference value thereof during the corresponding one of the execution and no execution of the purge of the vaporized fuel; and an air-fuel mixture ratio controller for performing an air-fuel mixture ratio control during the stratified lean air-fuel mixture ratio charge combustion and during the homogeneous lean air-fuel mixture ratio charge combustion separately during each of which referring to two kinds of the learning values derived by the presence-or-absence-or-purge dependent learning section.

According to the above aspects of the present invention, the load axis of a map including a plurality of the engine operating regions (or learning regions) for the purpose of updating and storing the air-fuel ratio correction learning value is the fuel supply quantity of fuel to be supplied to the engine and therefore not the air quantity which is used for the load axis in the map in the conventional control systems. In other words, the load axis of the map including the engine operating regions is the actual fuel supply quantity (or a value corresponding to a target torque) and therefore not the basic fuel supply quantity (or the intake air quantity to be charged in the cylinder) Tp. As a result, the learning region corresponding to the operation state (the fuel supply quantity) of the fuel supplying device can be searched or referred to regardless of the fact that the target air-fuel ratio (or the target equivalent ratio) is set around stoichiometric air-fuel ratio or at the lean air-fuel ratio. Accordingly control precision in the open loop control for the air-fuel ratio during the engine operation at the lean air-fuel ratio can be effectively improved.

Besides, the control system of the above aspects can avoid the fear to be arisen in case of newly and separately providing learning regions corresponding to the second mode engine operation (at the lean air-fuel ratio), i.e., the fear of transition from the first mode engine operation (around the stoichiometric air-fuel ratio) to the second mode engine operation becoming impossible for the following reason: The possibility of learning made in the newly provided learning regions (corresponding to the second mode engine operation) is small, and therefore it is impossible to meet a condition ("the learning value PHOS is updated and stored after engine starting") required for the transition from the first mode engine operation of the second mode engine operation.

Furthermore, the control system of the above aspects can securely avoid the fear to be arisen in case of extending each learning region (single unit) during the first mode engine operation so as to contain a region corresponding to the second mode engine operation, i.e., the fear of lowering precision in learning itself and accordingly the fear of lowering precision in the open loop control during the second mode engine operation in which air-fuel control is made upon referring to such a low precision learning result.

In summary, according to the above aspects, even in the air-fuel ratio control system in which the first mode engine operation (around stoichiometric air-fuel ratio) is changed over to the second mode engine operation and vice versa, air-fuel ratio feedback control under learning function can be achieved at a high control precision throughout the whole engine operating ranges maintaining learning chances, while making it possible to make an open loop control of air-fuel ratio at a high precision upon using the result of learning even though the embodiment is simple in configuration.

DETAILED DESCRIPTION OF THE INVENTION

Figure 1:
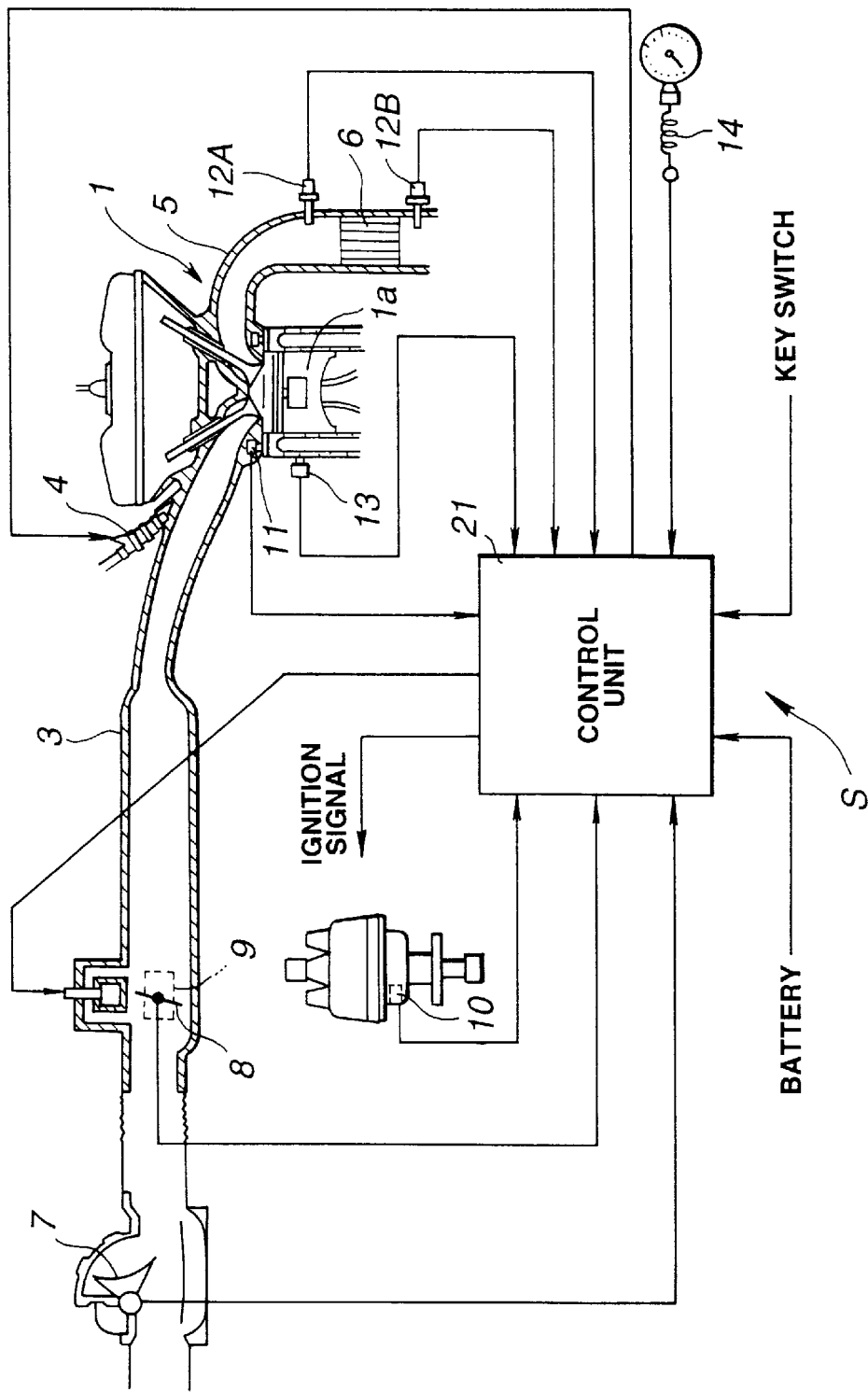
FIG. 1 is a schematic illustration of a first embodiment of a control system in combination with an internal combustion engine, according to the present invention.

Referring now to FIG. 1 of the drawings, a first embodiment of a control system according to the present invention is illustrated by the reference character S. The control system S of this embodiment is for a spark-ignition internal combustion engine 1 of an automotive vehicle. The engine 1 has a plurality of cylinders (only one cylinder is shown) each of which includes a combustion chamber. The engine 1 is provided with an intake air passage 3 which is communicable with the cylinders. A throttle valve 8 is disposed in the intake air passage 3 so as to be movable in relation to operation of an accelerator pedal (not shown). Fuel injector valves (or fuel supplying devices) 4 are disposed to project into the intake air passage 3, in which each fuel injector value 4 is located to supply fuel into each cylinder. Accordingly, intake air from an air filter (not shown) flows through the intake air passage 3 and sucked into the cylinders upon being controlled in flow amount by the throttle value 8. Fuel is injected from each fuel injector valve 4 toward the intake port for each cylinder, in response to a fuel injection signal. Accordingly, intake air and fuel injected from each fuel injector valve 4 are mixed in the cylinder thereby to form air-fuel mixture in the cylinder or the combustion chamber. Each fuel injector valve 4 may be disposed to project into each cylinder so as to directly inject fuel into each cylinder in case of a cylinder direct injection spark-injection internal combustion engine.

Air-fuel mixture formed in the cylinder is combusted under assistance of spark generated by a spark plug (not shown). Combustion gas of fuel depresses a piston 1a, and then is discharged from the cylinder through an exhaust gas passage 5 to a three-way catalytic converter 6. The three-way catalytic converter 6 functions to convert three noxious components (CO, HC and NOx) of the combustion gas or exhaust gas into harmless gas. Accordingly, the exhaust gas passing thought the three-way catalytic converter 6 is purified and discharged into atmospheric air.

An airflow meter 7 is disposed in the intake air passage 3 to detect an intake air (flow) quantity Qa (the quantity of intake air to be charged in the cylinder). A throttle opening degree sensor 9 is provided to detect an opening degree TVO of the throttle valve 8. A crankangle sensor 10 is provided to detect an engine speed Ne of the engine 1. An engine coolant temperature sensor 11 is provided to detect an engine coolant temperature Tw of engine coolant in a coolant passage (not identified) formed around the cylinders. A knock sensor 13 is provided to detect generation of engine knock of the engine 1. Additionally, a vehicle speed sensor 14 is provided to detect a vehicle speed of the vehicle.

Upstream-side and downstream-side oxygen ($O_2$) sensors 12A, 12B are disposed to project in the exhaust gas passage 5 and located respectively at the upstream and downstream sides of the three-way catalytic converter 6. Each oxygen sensor 12A, 12B functions to output a first value signal when air-fuel mixture (to be formed in the cylinder) has a rich air-fuel ratio of a rich air-fuel ratio ($\lambda=1$), and a second value signal when air-fuel mixture has a lean air-fuel ratio relative to stoichiometric air-fuel ratio. It will be understood that the rich air-fuel ratio is the air-fuel ratio of a rich air-fuel mixture which is richer in fuel than stoichiometric air-fuel mixture, and that the lean air-fuel ratio is the air-fuel ratio of a lean air-fuel mixture which is leaner in fuel than stoichiometric air-fuel mixture. The oxygen sensors 12A, 12B correspond to an air-fuel ratio detecting section.

The output signals from the oxygen sensors 12A, 12B are input to a control unit 21 to which the output signals from the airflow meter 7, the crankangle sensor 10, the engine coolant temperature sensor 11 and the like are input. The control unit 21 outputs the fuel injection signal for causing the fuel injector valve 4 to inject fuel, and is arranged to accomplish air-fuel ratio feedback control with learning function.

Figure 12:
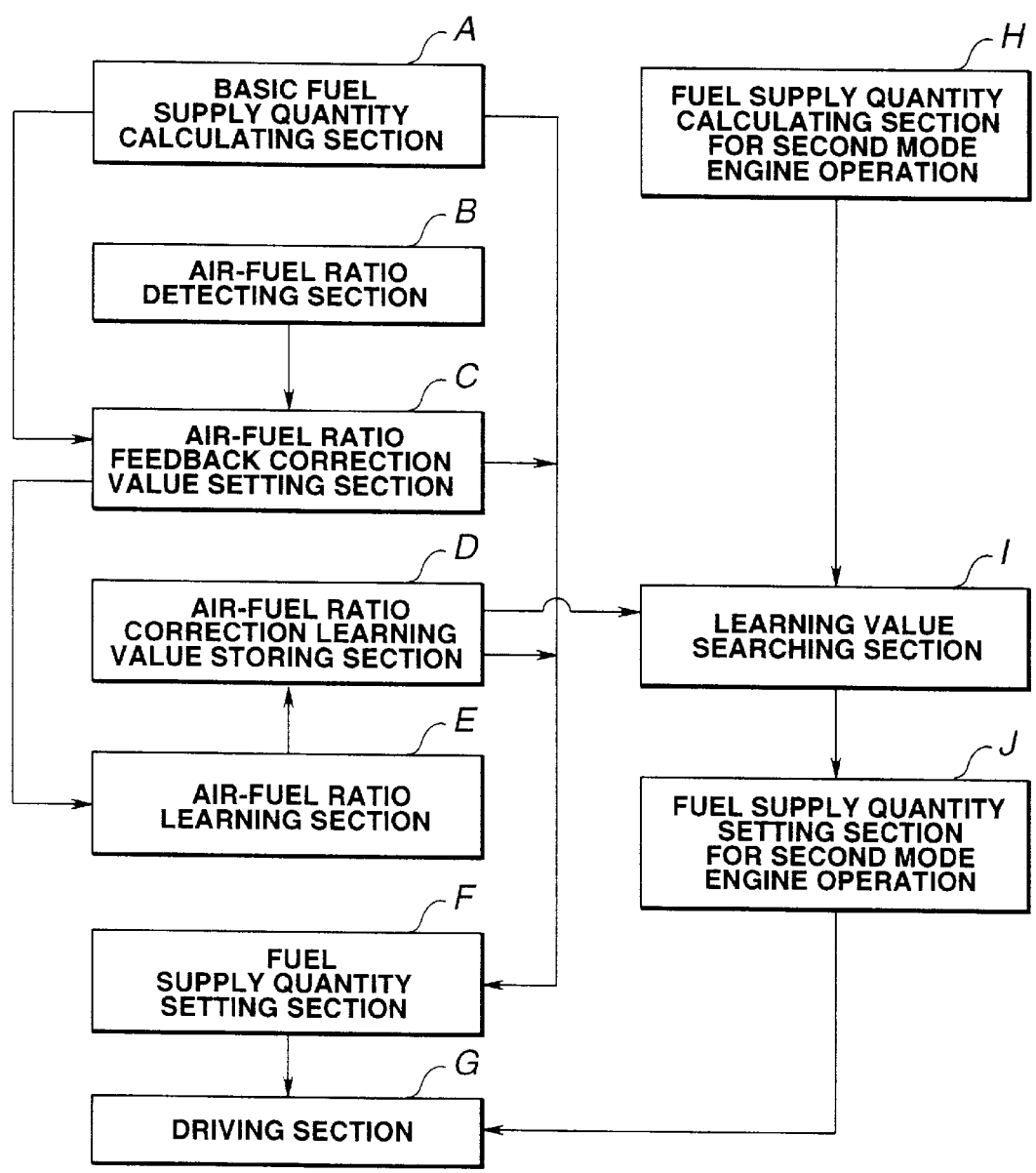
FIG. 12 is a block diagram showing the function of the first embodiment control system of FIG. 1.

As shown in FIG. 12, the control unit 21 includes a variety of sections A, C to J as software, and forms part of the control system S which is arranged to control an air-fuel ratio of air-fuel mixture to be formed in the engine both during a first mode engine operation made around stoichiometric air-fuel ratio and during a second mode engine operation made at lean air-fuel ratio. The control system S includes an air-fuel ratio detecting section A for detecting the air-fuel ratio by providing first and second value signals which correspond respectively to rich and lean air-fuel ratios of the air-fuel mixture to be formed in the engine, relative to stoichiometric air-fuel ratio.

The sections A, C to J will be discussed with reference to a block diagram of FIG. 12.

The basic fuel supply quantity calculating section A is provided for calculating a basic fuel supply quantity in accordance with an intake air quantity of air to be charged in a cylinder of the engine.

The air-fuel ratio feedback correction value setting section C is provided for setting an air-fuel ratio feedback correction value in accordance with the air-fuel ratio detected by the air-fuel ratio detecting section, the air-fuel ratio feedback correction value being for correcting the basic fuel supply quantity to cause an actual air-fuel ratio to approach vicinity of stoichiometric air-fuel ratio.

The air-fuel ratio correction learning value storing section D is provided for storing an air-fuel ratio correction learning value to be changeable in each of a plurality of engine operating regions which are formed by dividing an operating range of the engine in accordance with a fuel supply quantity of fuel to be supplied to the engine, the air-fuel ratio correction learning value being for correcting the basic fuel supply quantity.

The air-fuel ratio learning section E is provided for learning the air-fuel ratio by updating and setting the air-fuel ratio correction learning value stored by the air-fuel ratio correction learning value storing section, for each engine operating region in a manner to decrease a deviation of the air-fuel ratio correction learning value from a standard value of the air-fuel ratio feedback correction value corresponding to the engine operating region.

The fuel supply quantity setting section F is provided for setting a final value of the fuel supply quantity for the first mode engine operation in accordance with the basic fuel supply quantity, the air-fuel ratio feedback correction value and the air-fuel ratio correction learning value. The driving section G is provided for driving a fuel supply device (the fuel injector valve) in accordance with the final value of the fuel supply quantity for the first mode engine operation set by the fuel supply quantity setting section.

The fuel supply quantity calculating section H for the second mode engine operation is provided for calculating the fuel supply quantity under the second mode engine operation, in accordance with the intake air quantity to be charged into the cylinder, and a target air-fuel ratio.

The learning value searching section 1 is provided for searching the air-fuel ratio correction learning value storing section through the fuel supply quantity for the second mode engine operation to obtain the air-fuel ratio correction learning value.

The fuel supply quantity setting section J for the second mode engine operation is provided for setting a final value of the fuel supply quantity for the second mode engine operation in accordance with the air-fuel ratio correction learning value obtained by the learning value searching section and the fuel supply quantity for the second mode engine operation.

Next, a basic routine of the air-fuel ratio feedback control in accordance with the output of the upstream-side oxygen sensor 12A will be discussed with reference to a flowchart in FIG. 2. This routine is executed in timed relation to revolution (engine speed) of the engine, and in the control system S in FIG. 1.

First, at a step S51, judgment is made as to whether or not the upstream-side oxygen sensor 12A in a F/B condition to accomplish the air-fuel ratio feedback control. A flow goes to a step S52 in case of being in the F/B condition, or a step S71 in case of being not in the F/B condition.

Figure 6:
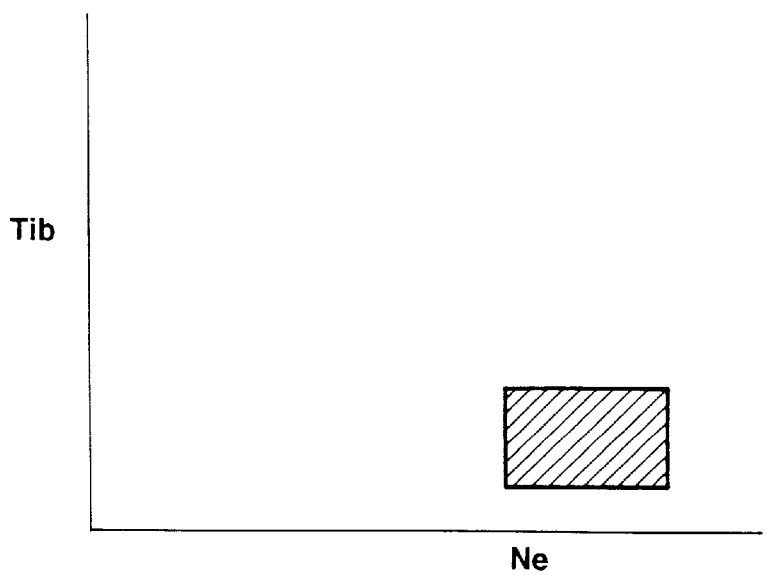
FIG. 6 is a characteristic map for searching proportional amounts PR, PL used in the control of the control system of FIG. 1.

At the step S52, judgment is made as to whether air-fuel ratio detected by the upstream-side oxygen sensor 12A is in a rich state or not by comparing the output of the upstream-side oxygen sensor 12A with a slice level corresponding to stoichiometric air-fuel ratio. If the air-fuel ratio is in the rich state, the flow goes to a step S53 at which judgement is made as to whether the rich state of the air-fuel ratio has been established also at a prior time such as the immediately preceding computer computation cycle. If the air-fuel ratio is not in the rich state (i.e. in lean state) at the step S52, the flow goes to a step S54 at which judgment is made as to whether the lean state has been established at the prior time. According to the result of judgment at the step S53 or S54, the flow goes to a step S55, a step S60, a step S63 or a step S68. At the steps S55, S60, S63 and S68, a proportional amount PR, PL or an integral amount IR, IL is looked up upon referring to a map and is stored in a register in a CPU of the control unit 21. The mapped values of the PR, PL, IR, IL have been previously provided and serve as basic control constants for the air-fuel ratio feedback control. The characteristics of the mapped values of the proportional amounts PR, PL is shown in FIG. 6, in which a map search value Tib and engine speed Ne of the engine 1 are utilized as parameters. A change amount of engine speed Ne may be utilized as one of the parameters. The map search value will be discussed after. FIG. 6 has a hatched particular zone or region having a much smaller value than that in other regions in order to avoid surging to be generated in the vehicle.

At steps S61 and S69, load correction is made on the integral amounts iR, iL to obtain final integral amount IR, IL which may be calculated by multiplying the mapped value iR, iL by the map search value Tib. Such load correction is necessary for the following reasons: The amplitude of the air-fuel ratio feedback correction coefficient α becomes larger in an engine operating range in which the control cycle of the correction coefficient α becomes longer. This provides the possibility of lowering an exhaust gas purifying efficiency of the three-way catalytic converter 6. In order to avoid this possibility, the amplitude of the correction coefficient α is made constant regardless of the control cycle of the correction coefficient α.

Figure 5:
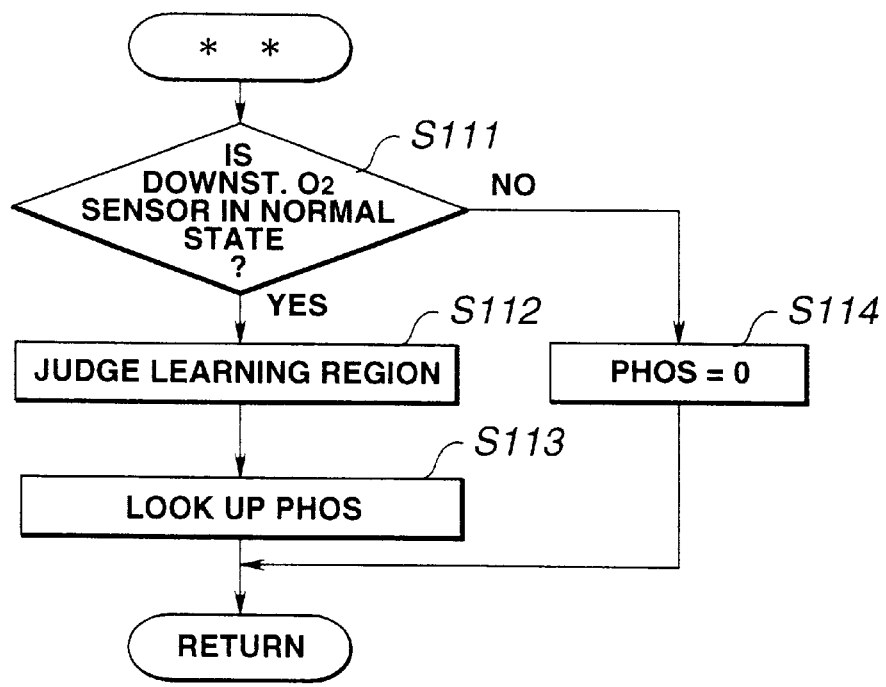
FIG. 5 is a flowchart showing a sub-routine for searching the learning value PHOS in the control of the control system of FIG. 1.

Concerning the mapped values of the proportional amounts PR, PL, at steps S58 and S66, the mapped values are corrected with a learning value PHOS (or air-fuel ratio correction learning value). This learning value PHOS is obtained by reading a value stored in the learning region (or the engine operating region) corresponding to the current engine operating condition upon searching a map for the learning value, at a steps S57 including steps S112 and S113 in a sub-routine of FIG. 5, and at step S65 including steps S112 and S113 in the sub-routine of FIG. 5. In the sub-routine of FIG. 5, at a step S111, judgment is made as to whether the downstream-side oxygen sensor 12B is in its normal state or not. When the oxygen sensor 12B is at the normal state, flow goes to the step 112 at which the learning region to which the current engine operating condition belongs is judged. At the step S113, the learning value PHOS is looked up from a map, in accordance with the judged learning region. When trouble is judged to arise in the downstream-side oxygen sensor 12B at the step S111, the flow goes to a step S114 at which the learning value PHOS is set at 0 in order to omit the learning function because the trouble makes low the reliability of the learning value PHOS.

Figure 3:
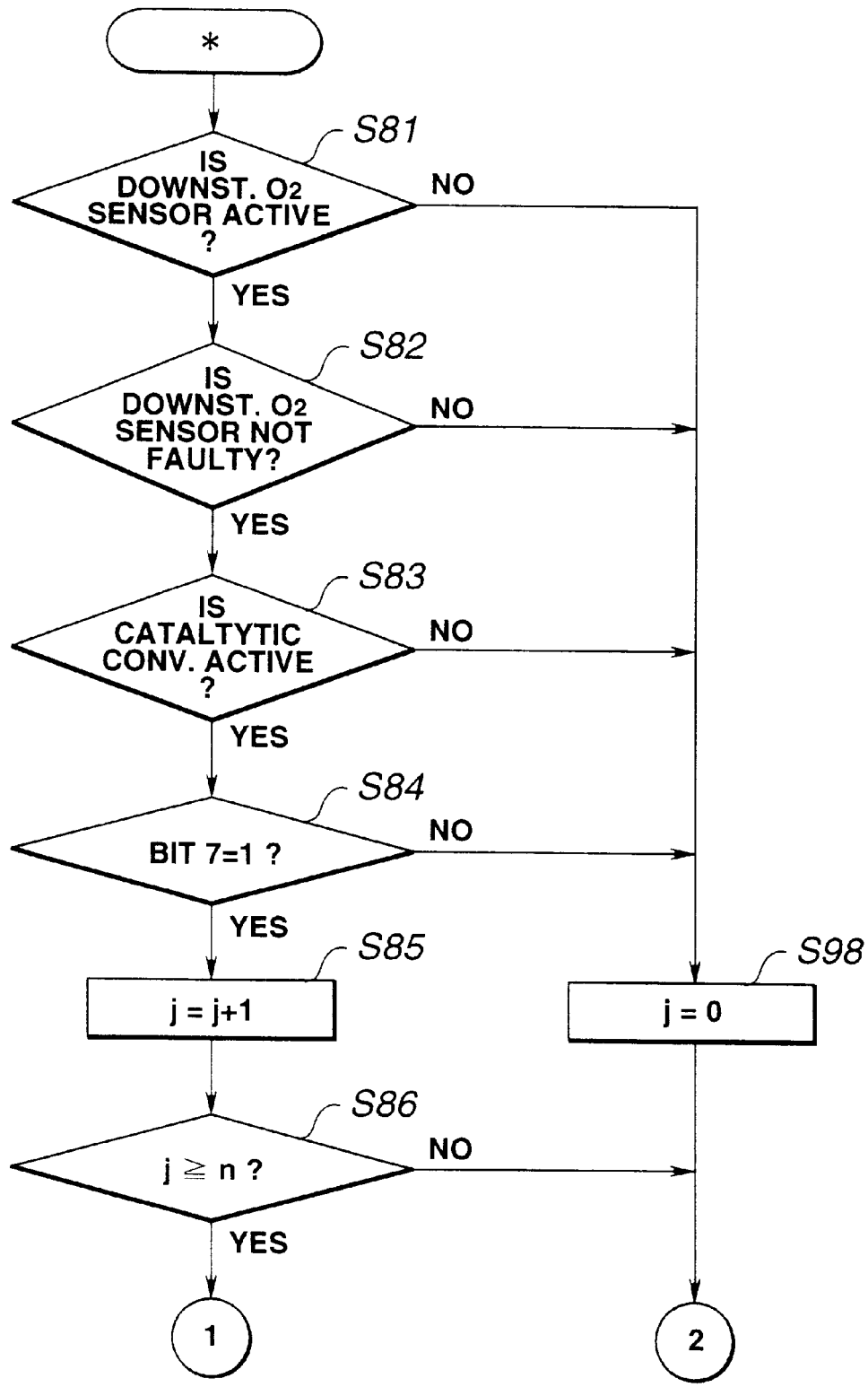
FIGS. 3 and 4 are flowcharts showing a sub-routine for updating a learning value PHOS used in the control of the control system of FIG. 1.
Figure 4:
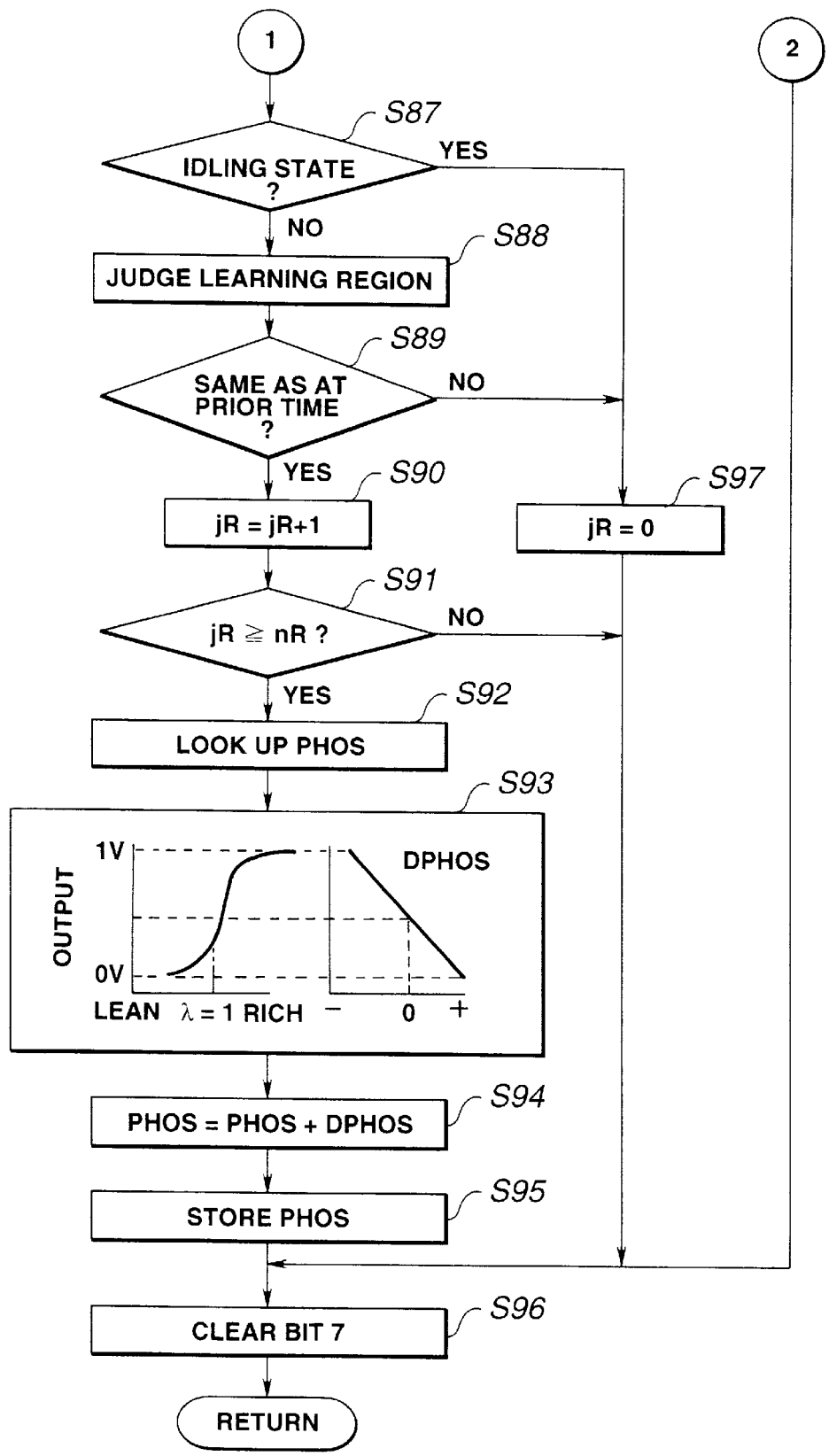

The learning value PHOS is updated in accordance with the output of the downstream-side oxygen sensor 12B when a predetermined learning condition has been established, at steps S56 and S64 each of which includes a sub-routine shown in FIGS. 3 and 4. The sub-routine in FIGS. 3 and 4 is executed in a computation cycle which corresponds to a cycle of inversion of from output of the first value signal to output of the second value signal and vice versa in the upstream-side oxygen sensor 12A. In the sub-routine in FIGS. 3 and 4, it is first confirmed at steps S81 to S91 that the learning condition to satisfy the following states (1) to (7) has been established:

(1) The downstream-side oxygen sensor 12B is in an active state (at the step S81).

(2) The downstream-side oxygen sensor 12B is not faulty (at the step S82).

(3) The three-way catalytic converter 6 is in an active state (at the step S83).

(4) The current engine operating condition is outside the particular zone (the hatched zone in FIG. 6) (at the step S84). There exists a bit (forming part of the numeral information of mapped values PR, PL) which remains as "0" without being used as a numeral, and therefore this bit ("7" in this example) is supplied with "1" for the numerical value stored in the particular zone. As a result, if the value of the bit 7 is "0", judgment is made such that the engine operating condition is outside the particular zone.

(5) The air-fuel ratio control is performed a certain number of times in the learning regions outside the particular zone (at the steps S85 and S86). The counter value j at the step S85 represents the number of times of the inversion between the lean air-fuel ratio and the rich air-fuel ratio of the air-fuel mixture after the engine operating condition is confirmed to be outside the particular zone. This counter value j is compared with a predetermined value n (for example, 12 times), in which it is confirmed that the air-fuel ratio feedback control has been performed a predetermined number of times in the learning regions outside the particular zone if $j \geq n$, at the step S85.

(6) Engine operation is not in idling state (at the step S87).

Figure 7:
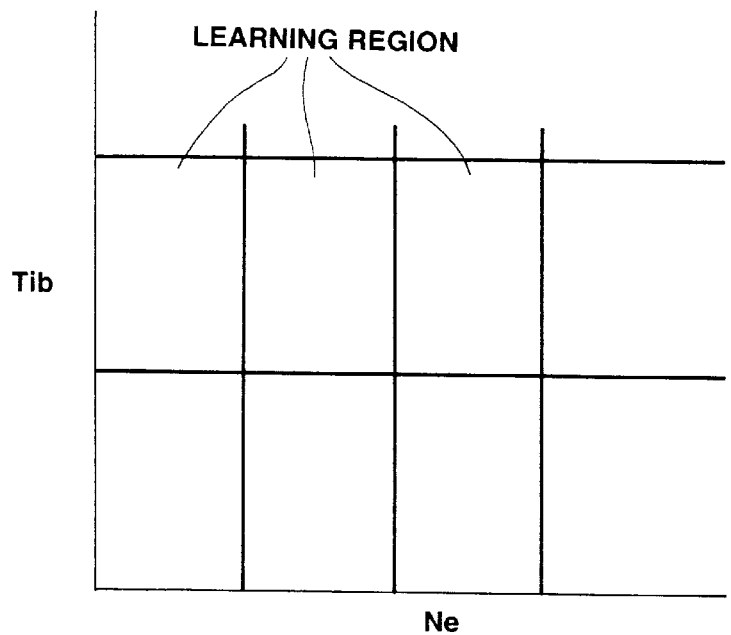
FIG. 7 is a table or map showing a plurality of learning regions for the learning values in the flowcharts of FIGS. 3 to 5.

(7) The engine operation condition is continuously staying a predetermined number of times in the same learning region (at the step S88 to the step S91). The learning regions are shown in FIG. 7, in which a plurality of the learning regions (or engine operating regions) are equally formed in terms of engine speed Ne and the map search value Tib (determined by a sub-routine of FIG. 9). The learning value PHOS is stored in each learning region.

Figure 9:
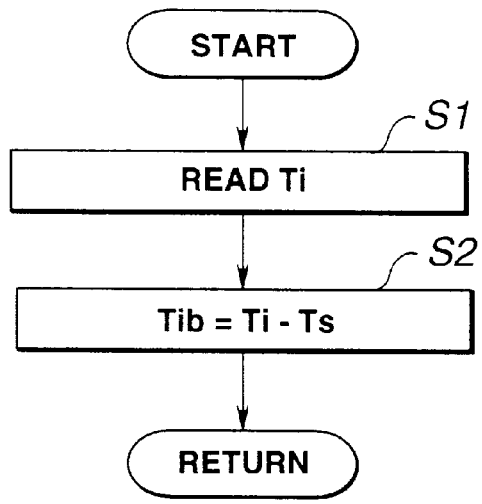
FIG. 9 is a flowchart showing a sub-routine for calculating a map search value Tib used in the control of the control system of FIG. 1.

Here, a calculation routine for the map search value Tib will be discussed with reference to a flowchart of FIG. 9.

At a step S1, a fuel injection pulse width (corresponding to the fuel injection quantity or fuel supply quantity) Ti is read. The fuel injection pulse width Ti is a pulse-width time at which the fuel injector valve 4 is opened to inject fuel, and calculated in accordance with the current engine operating condition (including a target equivalent ratio which will be discussed later, various correction coefficients and the like).

At a step S2, the map search value Tib (or fuel supply quantity for the second mode engine operation at the lean air-fuel ratio) is calculated. The map search value Tib is a parameter to be used only for searching a map and separate from parameters to be used for controlling fuel injection from the fuel injector valve 4. The map search value Tib is calculated by the following equation:

$$Tib = Ti - Ts$$

where Ts is the ineffective pulse width required to put the fuel injector valve from its closed state to its open state.

Now, this map search value Tib is Ti {≈Tp×TFBYA (the target equivalent ratio)}−Ts, and therefore is a value in relation to an actual fuel injection quantity (or quantity of fuel injected actually from the fuel injection valve) or in relation to a target torque of the engine. Accordingly, the map search value Tib takes generally the same value regardless of the fact that the target air-fuel ratio (or the target equivalent ratio) is set at a stoichiometric value or a lean value (of a lean air-fuel mixture). This can securely avoid the possibility of occurrence of the shortcomings that "the learning region to be referred to for the second mode engine operation or combustion condition (at the lean air-fuel ratio) does not necessarily corresponds to the learning region formed during the first mode engine operation or combustion condition (around the stoichiometric air-fuel ratio) in accordance with the basic fuel injection quantity Tp, because the basic fuel injection quantity Tp increases as air-fuel ratio becoming leaner". As a result, it is made possible to improve the precision in the open loop control for air-fuel ratio during the second mode engine operation (at the lean air-fuel ratio). The engine torque during the first mode engine operation (around the stoichiometric air-fuel ratio) is in relation to the basic fuel injection quantity Tp. This is, because the equivalent ratio takes a value corresponding to "$\lambda=1$", and therefore this basic fuel injection quantity Tp takes a value in relation to the actual fuel injection quantity. In contrast, the engine torque during the second mode engine operation (at the lean air-fuel ratio) is in relation to the actual fuel injection quantity and therefore not in relation to the basic fuel injection quantity (i.e., the intake air quantity to be charged in the cylinder) Tp because the intake air quantity is sufficient during the second mode engine operation.

The target equivalent ratio TFBYA is calculated in accordance with a target air-fuel ratio suitable for an engine operating condition, such as the operation amount of the accelerator pedal (representative of engine load) and the engine speed Ne. More specifically, the target equivalent ratio TFBYA is obtained by searching a map in accordance with the target torque (or the accelerator pedal operation amount) and the engine speed Ne so as to get a map-searched value, and by correcting the map-searched value with the engine coolant temperature, a vehicle speed and/or the like. Thus, the target equivalent ratio TFBYA is basically calculated as "standard air-fuel ratio (stoichiometric air-fuel ratio)/target air-fuel ratio"; however, this ratio may be corrected with the engine coolant temperature. It will be understood that an equivalent ratio is a value of [stoichiometric air-fuel ratio/actual air-fuel ratio].

Turning back to the flowchart of FIG. 4, at the step S88, judgement is made to determine the learning region to which the current engine operation condition belongs. At the step S89, judgment is made as to whether the determined learning region is the same as that at the prior time. If the current engine operation condition belongs to the same learning region as that at the prior time, increment is made by 1 on a counter value jR at the step S90. The counter value jR represents a number of times of inversion between the lean air-fuel ratio and the rich air-fuel ratio of the air-fuel mixture, at which number of times the same learning region is maintained. This counter value jR is compared with a predetermined value nR, for example, by six times at the step S91. If jR$\geq$nR, it is judged that the engine operating condition stays continuously a certain number of times in the same learning region.

Here, it is judged that the learning condition has been established when the above-mentioned states (1) to (7) are satisfied, and accordingly the learning value PHOS stored in the learning region to which the current engine operating condition belongs is read or looked up to be stored in the register in the CPU, at a step S92.

An updated amount DPHOS of the learning value PHOS takes a negative value in case that the air-fuel ratio detected by the downstream-side oxygen sensor 12B is in a rich side (at the rich state), and takes a positive value in case that the air-fuel ratio is in a lean side (at the lean state). The reason why such an updated amount DPHOS is utilized is as follows: The learning value PHOS is corrected in such a manner that the updated amount DPHOS is added to the learning value PHOS at a step S94. Accordingly, the learning value PHOS becomes smaller by providing the negative value for the updated amount DPHOS in the rich side of the air-fuel ratio, and therefore one proportional amount PR becomes larger while the other proportional amount PL becomes smaller, so that the air-fuel ratio returns to the lean side. Similarly, the air-fuel ratio can return to the rich side by providing the positive value for the updated amount DPHOS in the lean side of the air-fuel ratio. It will be understood that both the proportional amounts PR, PL may not be changed so that only one of them is changed.

The value (absolute value) of the updated amount DPHOS of the learning value is set in accordance with the output of the downstream-side oxygen sensor 12B in such a manner that the updated amount DPHOS increases as the output (voltage) of the downstream-side oxygen sensor 12B shifts largely from an intermediate value ($\lambda=1$) so that the updated amount becomes small around the intermediate value of the output of the downstream-side oxygen sensor, at a step S93.

Figure 8:
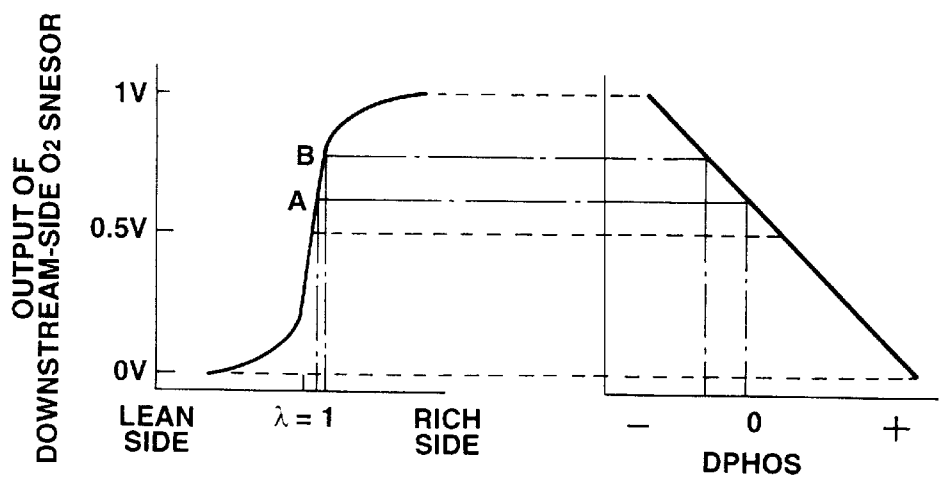
FIG. 8 is a characteristic graph showing the relationship between the output of a downstream-side oxygen sensor in the control system of FIG. 1 and the updated amount DPHOS of the learning value PHOS.

The characteristics shown in the column of the step S93 is enlarged and illustrated in detail in FIG. 8, in which the output wave form of the downstream-side oxygen sensor 12B takes the shape of rotation symmetry in which the intermediate value of 0.5 V is located at the center while setting 0 V at the minimum value and 1 V at the maximum value. A linear function is prepared to have abscissa for the output of the downstream-side oxygen sensor 12B and ordinate for the updated amount DPHOS of the learning value, in which the linear function has an inclination which lowers in a direction toward the right side as shown in the right-side graph in FIG. 8. Additionally, the updated amount DPHOS is determined to be 0 at the intermediate value of the output of the downstream-side oxygen sensor 12B. Consequently, the absolute value of the updated amount DPHOS becomes larger as the output of the downstream-side oxygen sensor 12B shifts larger from the intermediate value. For example, making comparison between points A and B in FIG. 8, the absolute value of the updated amount DPHOS is larger at the point B which is separate farther from the intermediate value than the point A.

The thus obtained updated amount DPHOS is added to the learning value PHOS stored in the register thereby to update the learning value, at the step S94. This updated learning value PHOS is stored in the same learning area, at a step S95.

By changing the updated amount DPHOS of the learning value in accordance with the output of the downstream-side oxygen sensor 12B, it is made possible to prevent overshoot and undershoot of the air-fuel ratio to be controlled while improving the converging characteristics of the air-fuel ratio into a window. While this embodiment has been shown and described as being arranged such that the updated amount of the learning value is variable in accordance with the output of the downstream-side oxygen sensor, it will be appreciated that the principle of the present invention may be applied to a control system in which the updated amount of the learning value is set at a predetermined value.

Finally, the value of the bit 7 of the numerical information of the mapped values PL, PR stored in the register of the CPU is returned to "0" and newly stored, at a step S96. The procedure in this step is accomplished for the following reason: The numerical information bit inherently represents numerical values, and therefore "1" of the bit 7 will be avoidably dealt with as apart of the numerical values.

At a step S98, the counter value j is set at 0. At a step S97, the counter value jR is set at 0.

Turning back to FIG. 2, the air-fuel ratio feedback correction coefficient (air-fuel ratio feedback correction value) α is calculated in accordance with air-fuel ratio feedback control constants (the proportional amounts PR, PL and the integral amounts IR, IL), at steps S59, S62, S67 and S70.

Figure 2:
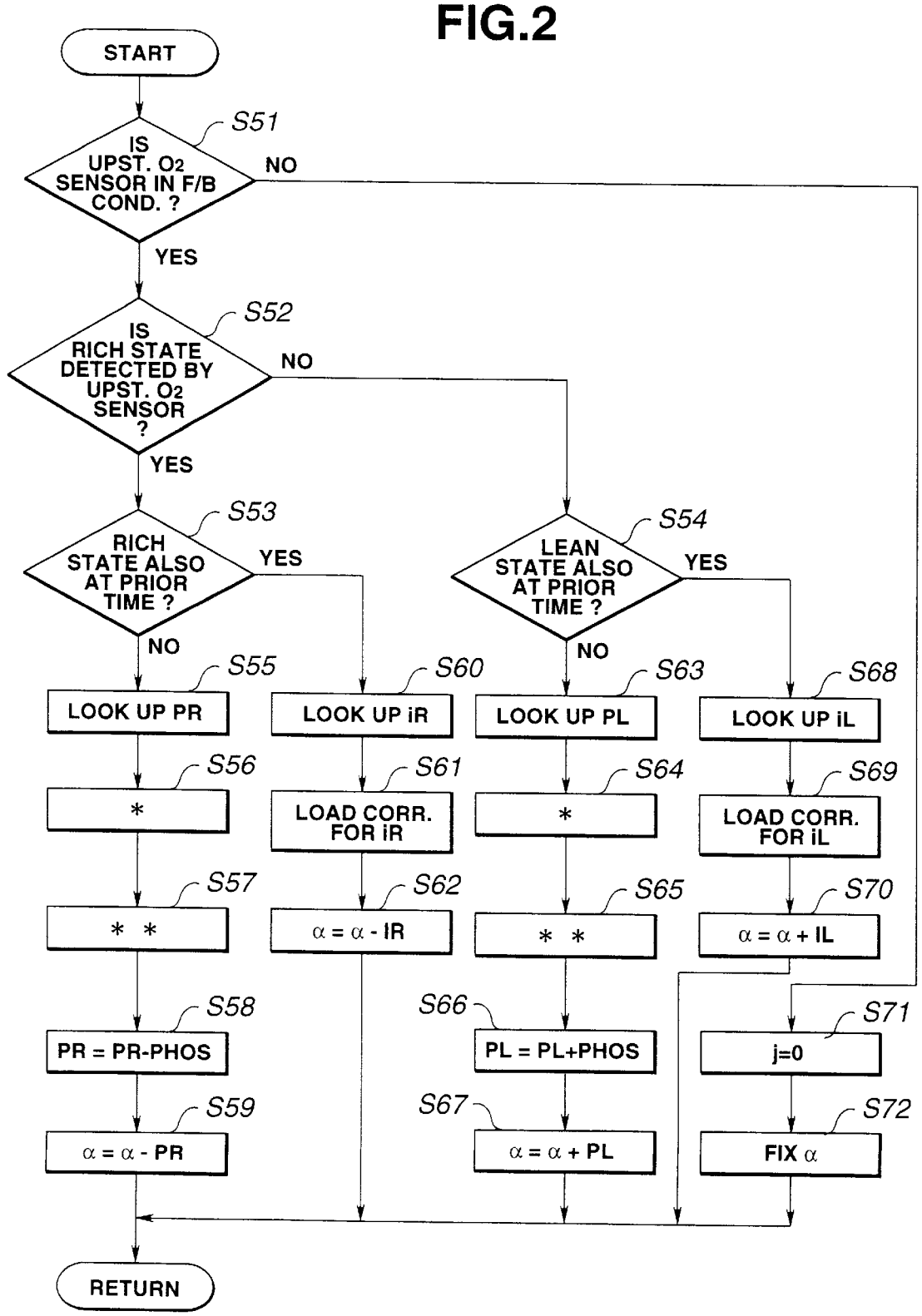
FIG. 2 is a flowchart showing a routine for calculation of an air-fuel ratio feedback correction coefficient α used in a control of the control system of FIG. 1.

At the step S71 in FIG. 2, the counter value j is set at 0. At a step S72, the air-fuel ratio correction coefficient α is fixed at a value at the immediately preceding computation cycle.

Figure 10:
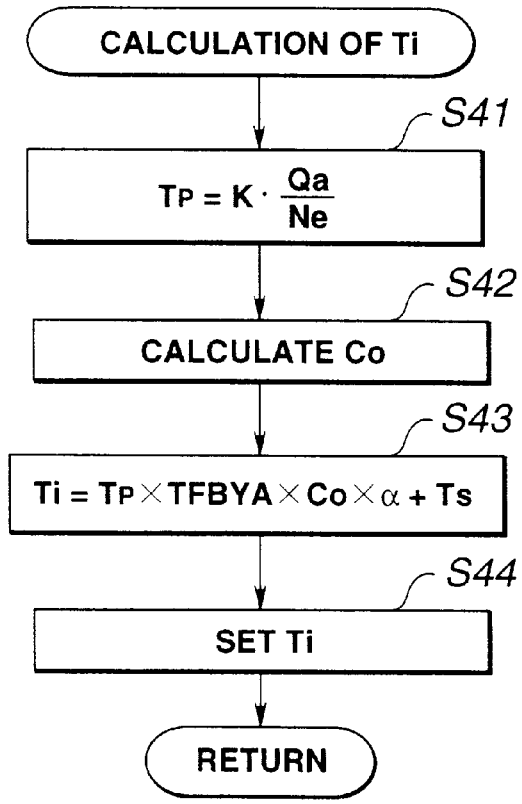
FIG. 10 is a flowchart showing a sub-routine for calculating a fuel injection pulse width Ti used in the control of the control system of FIG. 1.

The fuel injection pulse width Ti is calculated in accordance with the thus obtained correction coefficient α by executing a routine in a flowchart of FIG. 10. This routine is executed in timed relation to revolution (engine speed) of the engine.

In the flowchart of FIG. 10, at a step S41, the basic fuel injection quantity or pulse width (=K·Qa/Ne where K is a constant and in relation to the intake air quantity to be charged in the cylinder during engine operation around stoichiometric air-fuel ratio). At a step S42, Co is calculated. This Co is a sum of 1 and various correction coefficients such as a correction coefficient KTw for correcting to increase the amount of the correction as the engine coolant temperature is lower. At a step S43, the fuel injection pulse width Ti is calculated by correcting the basic fuel injection quantity Tp with the target equivalent ratio TFBYA (set in accordance with the first mode engine operation around the stoichiometric air-fuel ratio or with the second mode engine operation at the lean air-fuel ratio), the air-fuel ratio feedback correction coefficient α, the sum Co and Ts (the ineffective pulse width), at a step S43. In this connection, the air-fuel ratio feedback correction coefficient α is used during the first mode engine operation around the stoichiometric air-fuel ratio to obtain the corrected value as the fuel injection pulse width Ti to be provided to the fuel injector valve 4; however, this correction coefficient α is replaced with a value (1.0±the learning value PHOS) during the second mode engine operation at the lean air-fuel ratio to obtain the corrected value. At a step S44, the thus calculated fuel injection pulse width Ti is set.

As discussed above, according to this embodiment, when the learning value is updated and stored in and searched from the map, the map search value Tib (corresponding to the actual fuel injection quantity and accordingly to the intake air quantity to be charged in the cylinder) is used as the parameter without using the basic fuel injection quantity (i.e., the intake air quantity to be charged in the cylinder) set for the engine operation around stoichiometric air-fuel ratio as the parameter. Consequently, the learning area corresponding to the operating condition (i.e., the actual fuel injection quantity) of the fuel injector valve 4 can be referred to regardless of the fact that the target air-fuel ratio (or the target equivalent ratio is set in the elan side or in the rich side. Accordingly, it can be made possible to cause the region to be referred to or searched during the engine operation at the lean air-fuel ratio to coincide with the learning region during the engine operation around the stoichiometric air-fuel ratio. As a result, control precision in the open loop control for the air-fuel ratio during the engine operation at the lean air-fuel ratio can be effectively improved.

Besides, this embodiment can avoid the fear to be arisen in case of newly and separately providing learning regions corresponding to the second mode engine operation (at the lean air-fuel ratio), i.e., the fear of transition from the first mode engine operation (around the stoichiometric air-fuel ratio) to the second mode engine operation becoming impossible for the following reason: The possibility of learning in the newly provided learning regions (corresponding to the second mode engine operation) is small, and therefore it is impossible to meet a condition ("the learning value PHOS is updated and stored after engine starting") required for the transition from the first mode engine operation to the second mode engine operation.

Furthermore, this embodiment can securely avoid the fear to be arisen in case of extending each learning region (single unit) during the first mode engine operation so as to contain a region corresponding to the second mode engine operation, i.e., the fear of lowering precision in learning itself and accordingly the fear of lowering precision in the open loop control during the second mode engine operation in which air-fuel ratio control is made upon referring to such a low precision learning result.

In summary, according to this embodiment, even in the air-fuel ratio control system in which the first mode engine operation (around stoichiometric air-fuel ratio) is changed over to the second mode engine operation and vice versa, air-fuel ratio feedback control under learning function can be achieved at a high control precision throughout the whole engine operating ranges maintaining learning chances, while making it possible to make an open loop control of air-fuel ratio at a high precision upon using the result of learning even though the embodiment is simple in configuration.

In the above embodiment, the actual fuel injection quantity is utilized as the map search value Tib ("Ti–Ts"). However, assuming that the learning value PHOS and accordingly the air-fuel ratio feedback correction coefficient α shifts largely from the standard value (for example, 1.0), Ti itself is unavoidably affected to be changed, and therefore there is the fear of referring to a learning region which is different from a learning region intended to be referred to. In view of this, Ti used for calculating the map search value Tib may be divided by the air-fuel ratio feedback correction coefficient α and Co (including the correction coefficient KTw and the like) in order to suppress a change due to these correction coefficients. In other words, at the step S2 in the flowchart of FIG. 9, the map search value Tib may be calculated according to the following equation:

$$Tib=(Ti-Ts)/\alpha/Co$$

this can securely avoid the fear of referring to the learning region which is different from the learning region intended to be referred, even in case that the learning value PHOS and accordingly the air-fuel ratio feedback correction coefficient α shifts from the standard value (for example, 1.0), for example, with lapse of time. Consequently, precision in learning and accordingly precision in the air-fuel ratio feedback control can be further improved while similarly improving the control precision in open loop control for the air-fuel ratio by using the result of this learning.

Figure 11:
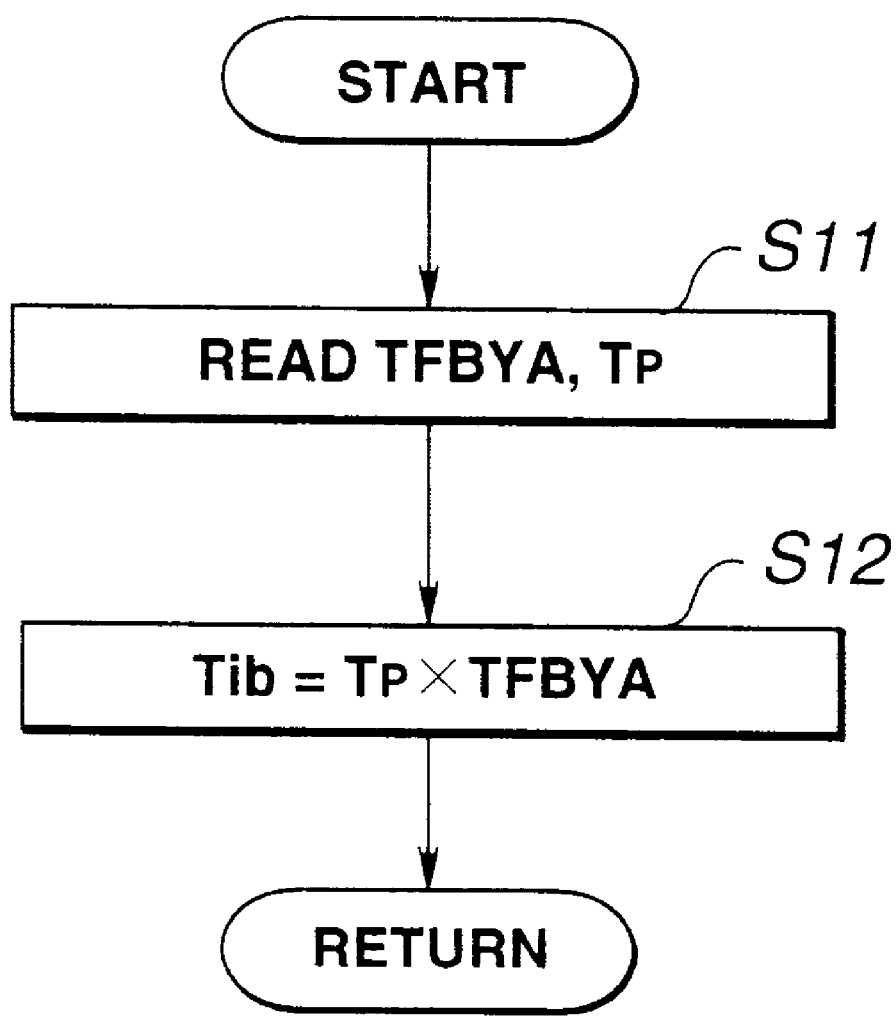
FIG. 11 is a flowchart showing a sub-routine for calculating a map search value Tib used in the control of a second embodiment of the control system according to the present invention.

Next, a second embodiment of the control system according to the present invention will be discussed with reference to FIG. 11. The second embodiment is similar to the first embodiment with exception that a sub-routing of FIG. 11 is utilized in place of the sub-routing of FIG. 9. Therefore, explanation will be made only on the sub-routine for calculating the map search value Tib.

In this embodiment, the map search value Tib is calculated according to the flowchart of FIG. 11.

At a step S11, the target equivalent ratio TFBYA and the basic fuel injection quantity Tp are read.

At a step S12, the map search value Tib is calculated according to the following equation:

$$Tib = Tp \times TFBYA$$

By utilizing the thus obtained map search value Tib (the fuel supply quantity for searching the air-fuel ratio learning value), the learning value is updated and stored, searched and referred to in the same manner like in the first embodiment.

With the thus arranged second embodiment control system, it is made possible to coincide the learning region intended to be referred to during the second mode engine operation at the lean air-fuel ratio, with the learning region used during the first mode engine operation around stoichiometric air-fuel ratio, similarly to the first embodiment. Besides, according to the second embodiment, the map search value Tib is calculated by multiplying the intake air quantity or flow amount Qa (intake air quantity or flow amount to be charged in the cylinder Tp≈Qa/Ne) by the target equivalent ratio, without calculating the map search value Tib (corresponding to the target engine torque) by making inverse operation for the fuel injection pulse width Ti.

As a result, calculation amount in the control is further decreased thereby simplifying control logic in the control system.

Further, the map search value Tib cannot be affected by the learning value PHOS and accordingly by the air-fuel ratio feedback correction coefficient α. From this view point, learning control and accordingly the air-fuel ratio feedback control can be realized at a further high precision, while achieving the open loop control for the air-fuel ratio at a further high precision by using the result of the learning control.

While the upstream-side and downstream-side oxygen sensors 12A, 12B have been shown and described as being provided at the upstream and downstream sides of the three-way catalytic converter in the above-discussed embodiments, it will be appreciated that the principle of the present invention may be applicable to all control systems each of which is provided with either one of the upstream-side and downstream-side oxygen sensors and arranged as follows: The air-fuel ratio feedback correction coefficient α is given in accordance with the output of the oxygen sensor under a proportional-plus-integral control (with the integral and proportional amounts), while the deviation of the air-fuel ratio feedback correction coefficient α from the standard value is updated and stored as the learning value in the learning control, upon which the result of this learning control is referred to and applied to at the next time (or next computation cycle) air-fuel ratio feedback control or open loop control for the air-fuel ratio. In other words, the scope of the present invention covers whatever control systems and modes using a map for storing the learning value which map has the load axis of the map search value Tib (corresponding to actual fuel injection quantity and accordingly to the target engine torque).

Figure 13A:
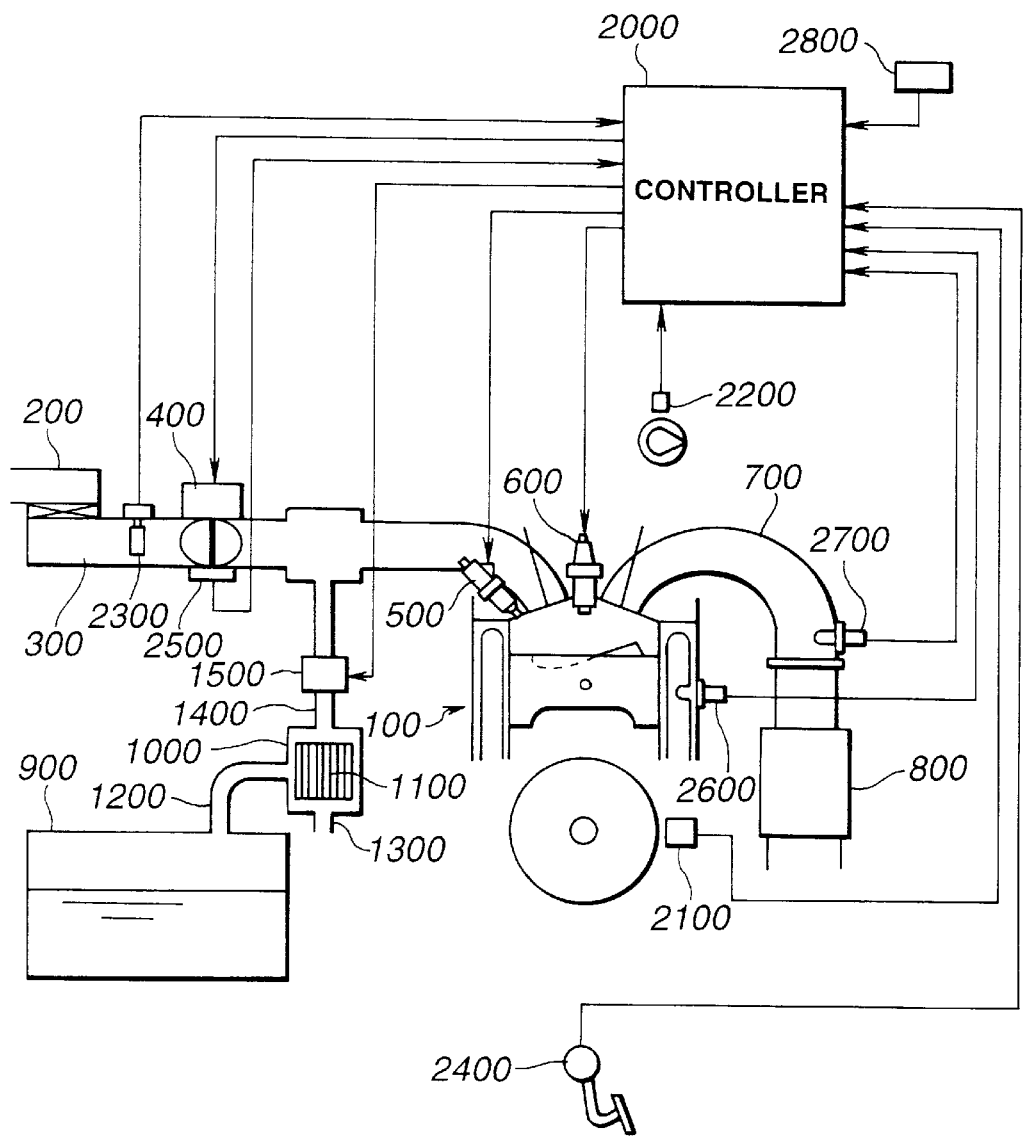
FIG. 13A is a schematic circuit block diagram of the circuit block diagram of the control system for controlling the internal combustion engine in a third preferred embodiment according to the present invention.

FIG. 13A shows a schematic circuit block diagram of an internal combustion engine to which the present invention in a third preferred embodiment is applicable.

An external air is sucked into a combustion chamber of each cylinder of an internal combustion engine 100 through an intake air passage 300 and receiving a control of an electronically controlled throttle valve 400.

An electromagnetic type fuel injection valve 500 is installed in the intake air passage 300 near to an intake valve so as to directly inject a given quantity of fuel (which will be described later) into each corresponding combustion chamber of the engine 100.

Each fuel injection valve 5 receives an electric power at its solenoid portion in response to a fuel injection pulse signal outputted during a suction stroke or a compression stroke of its corresponding cylinder in synchronization with an engine revolution from a controller 2000 as will be described later and injects the given quantity of fuel whose pressure is regulated under a predetermined pressure into its corresponding combustion chamber.

The injected fuel forms a homogeneous air mixture fuel diffused within the corresponding combustion chamber in the case of the fuel injection during its suction stroke of the corresponding cylinder.

The injected fuel forms a stratified air mixture fuel concentratedly around a corresponding spark plug 600 in the case of the fuel injection during its compression stroke of the corresponding cylinder.

An ignition signal is issued from the controller 2000 on a basis of which an air mixture fuel in each corresponding one of the combustion chambers of the engine 100 is ignited and combusted (in a homogeneous charge combustion or in a stratified charge combustion).

Figure 15:
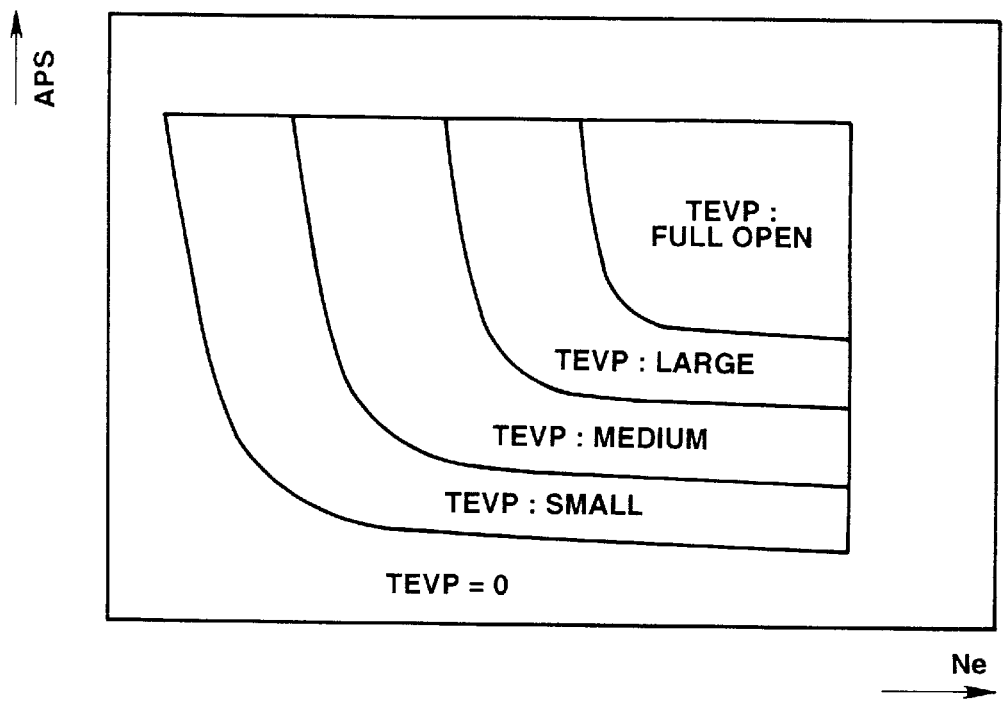
FIG. 15 is a map representing a fuel combustion mode switching according to an engine operating condition used in the third embodiment.
Figure 16:
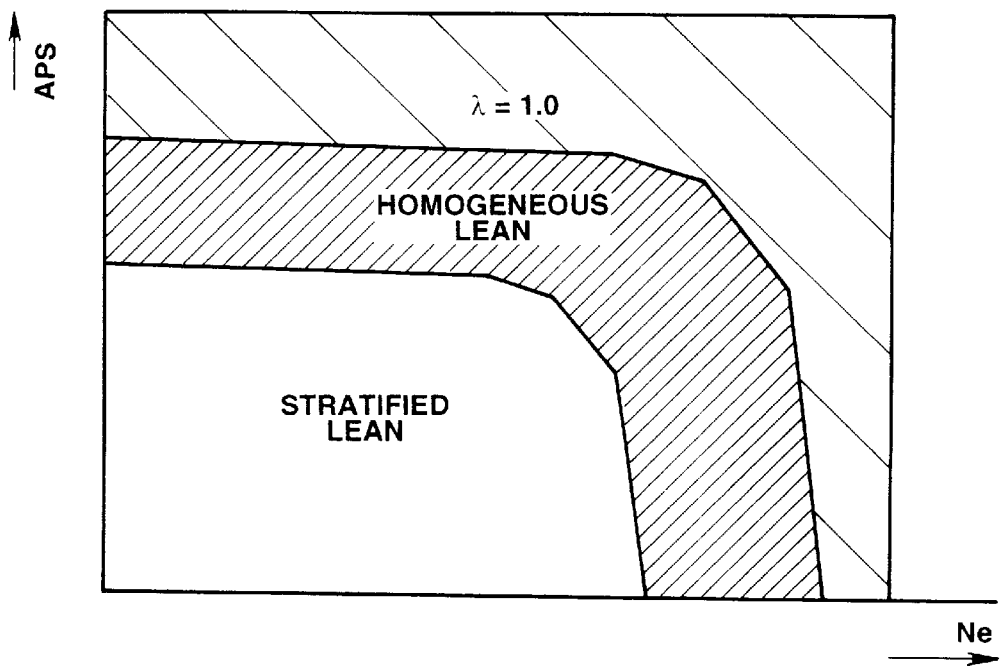
FIG. 16 is a map representing a target opening angle controlled value of a purge control valve according to the engine operating condition.

It is noted that the combustion condition in each combustion chamber is divided into three combustion conditions in a combination with an air fuel mixture ratio control: a homogeneous stoichiometric air-fuel mixture ratio charge combustion; a homogeneous lean air-fuel mixture ratio charge combustion (air-fuel mixture ratio ranging from 20 to 30); and a stratified lean air-fuel mixture ratio charge combustion (air-fuel mixture ratio being about 40) (refer to FIGS. 15 and 16).

An exhaust gas from the engine 100 is exhausted externally through an exhaust gas passage 700, a catalytic converter 800 for purifying the exhaust gas, the catalytic converter 800 being interposed in the exhaust gas passage 700.

In addition, a canister 1000 as a vaporized fuel processor is disposed in order to process the vaporized fuel generated from a fuel tank 900.

The canister 1000 includes adsorbent 1100 such as an activated carbon within a hermetically sealed vessel to which a vaporized fuel conduit pipe 1200 is connected.

Hence, the vaporized fuel generated at the fuel tank 900 during a stop of the engine 100 is introduced into the canister 100 via a vaporized fuel conduit pipe 1200 and adsorbed thereonto.

The canister 1000 is formed with a fresh air introducing inlet 1300 and a purge passage 1400 is formed from the canister 1000.

The purge passage 1400 is connected at a downstream side (an intake manifold) of the intake air passage 300 via a purge control valve 1500.

The purge control valve 1500 is opened in response to a signal outputted under a predetermined condition during the drive of the engine 100 from the controller 2000.

Hence, when a purge enabling condition is established during the engine operation after a start of the engine 100, the purge control valve 1500 is open and an intake negative pressure is acted upon the canister 1000.

As a result of an action of the intake negative pressure of the engine 100 upon the canister 1000, the air introduced from the fresh air introducing inlet 1300 causes the vaporized fuel adsorbed onto the adsorbent 1100 of the canister 1000 to be desorbed therefrom. The purge gas including the desorbed vaporized fuel is sucked through the purge passage 1400 onto the downstream side of the intake air passage 300 with respect to the throttle valve 400. Thereafter, the purge gas is combusted within each combustion chamber of the engine 100.

Figure 13B:
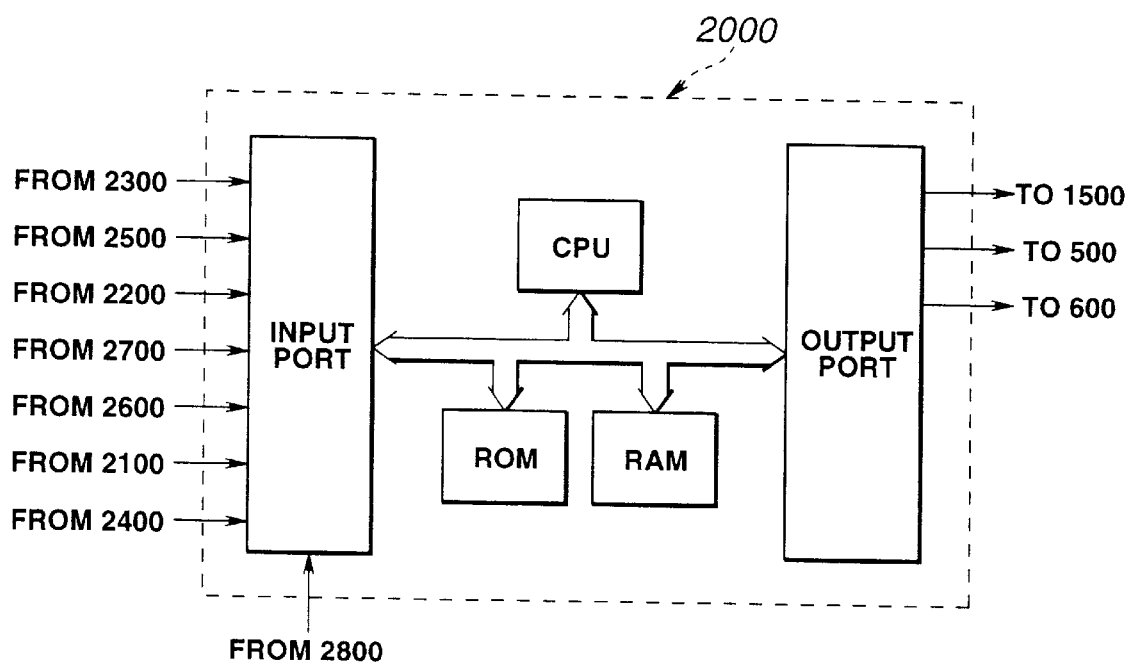
FIG. 13B is a schematic circuit block diagram of a controller 2000 in the third embodiment shown in FIG. 13A.

The controller 2000 includes a microcomputer, as shown in FIG. 13B, a CPU (Central Processing Unit), a ROM (read Only Memory), a RAM (Random Access Memory), A/D converter, and an output interface.

Upon receipt of input sensor signals from various sensors, the controller 2000 arithmetically calculates various functions based on the input signal to control each fuel injection valve 500, each spark plug 600, and each purge control valve 1500.

The various types of sensors include: crank angle sensors 2100 and 2200 for detecting a rotation of the engine 100 or a rotation of a cam shaft. If the number of cylinders is n, these crank angle sensors 2100 and 2200 output a reference pulse signal REF at a predetermined crank angular position (for example, 110° before an upper top dead center in the compression stroke of teach corresponding cylinder) and outputs a unit angle pulse single POS whenever a unit pulse signal corresponding to 1° to 2° angular displacement of the crankshaft is generated. Consequently, it is possible to calculate an engine revolution speed Ne according to a period of the reference pulse signal REF described above.

Furthermore, an airflow meter 2300 for detecting an intake air quantity Qa at an upper stream of the throttle valve 400 of the intake air passage 300, an acceleration sensor 2400 for detecting an opening angle TVO of the throttle valve 400 (including an idle switch which is turned to ON when the throttle valve 400 is completely closed), a coolant temperature sensor Tw of the engine 100, an oxygen concentration sensor 2700 for outputting a signal corresponding to a rich or lean side of an exhaust gas air-fuel mixture ratio in the exhaust gas passage 700, and a vehicle speed sensor 2800 detecting a vehicle speed VSP.

Next, the air-fuel mixture ratio and purge controls executed in the third embodiment will be described below with a chief reference to FIGS. 14A and 14B.

Figure 14A:
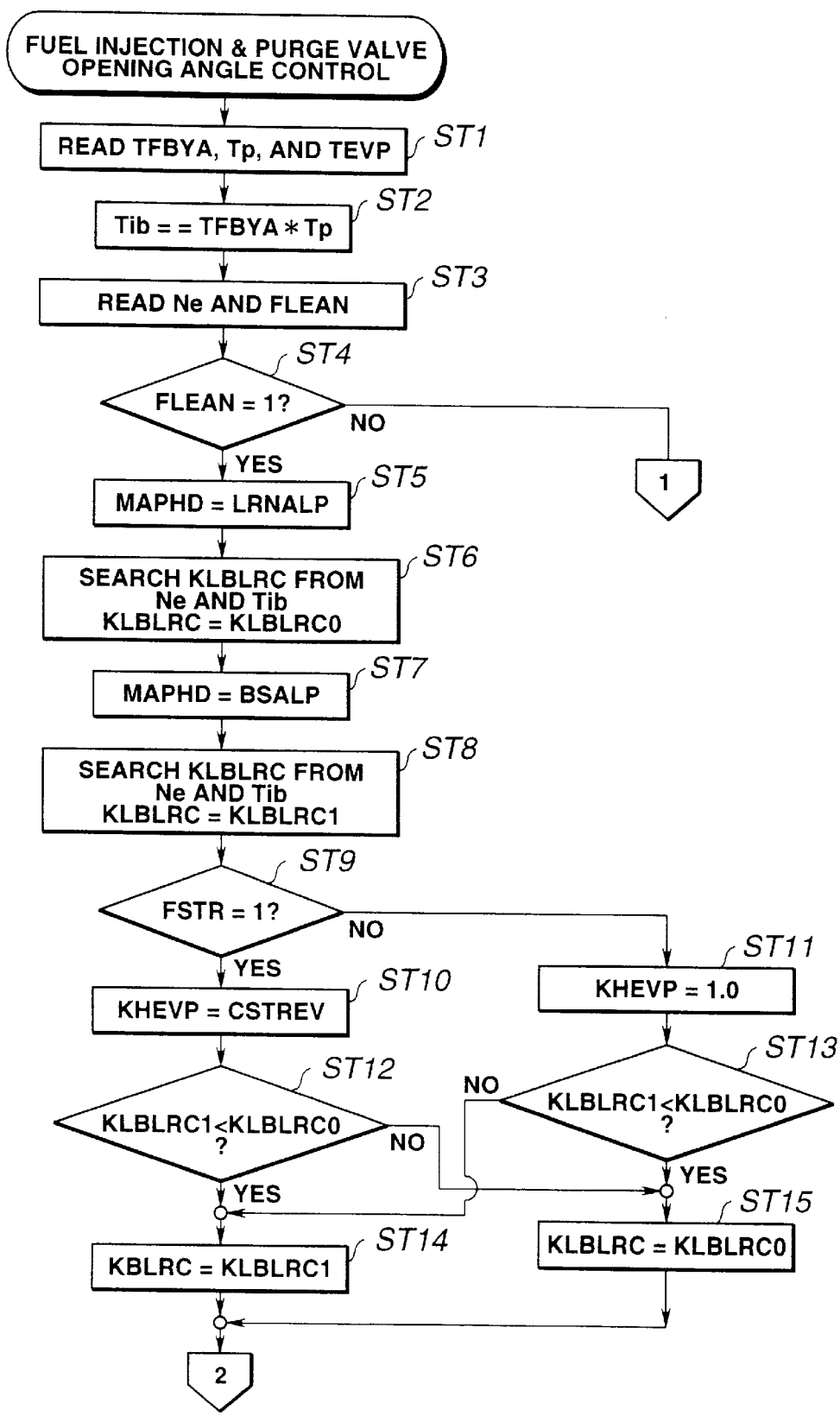
FIGS. 14A and 14B are integrally a flowchart for explaining an execution of a fuel injection control and purge control by the controller 2000 in the third embodiment.

At a step ST1 of FIG. 14A, the CPU of the controller 2000 reads a target equivalence (equivalent) ratio TFBYA, a basic fuel supply (injection) quantity Tp, and a target purge control valve opening angle TEVP.

It is noted that an equivalence (or equivalent) ratio is defined as a rate of a fuel-air mixture ratio (F/A) with respect to the stoichiometric air-fuel ratio and the target equivalence ratio TFBYA is retrieved (searched) directly from a map on the basis of the accelerator opening angle ACC derived from the acceleration sensor 2400 and the engine speed Ne derived on the basis of the reference signal REF, or alternatively may be retrieved from another map on the basis of a target torque tTe derived from both of the accelerator opening angle ACC and the engine speed Ne and the engine speed Ne.

The basic fuel supply (injection) quantity Tp is a provisional fuel injection quantity with respect to a cylinder intake air quantity Q derived from an intake air quantity Qa detected by the airflow meter 2300 and the engine speed Ne at a reference equivalence ratio (=1) corresponding to the stoichiometric air fuel mixture ratio. The target purge control valve opening angle TEVP is retrieved from another map on the basis of the engine speed Ne and the engine load such as the basic fuel supply (injection) quantity Tp (refer to FIG. 16).

At a step ST2, the CPU of the controller 2000 calculates another fuel injection quantity Tib corresponding to the target equivalence ratio TFBYA and used to retrieve a learning value on the air-fuel mixture ratio (as will be described below) as follows:

$$Tib = TFBYA \times Tp \text{ (or expressed as } Tib = TFBYA*Tp).$$

At a step ST3, the CPU of the controller 2000 reads engine speed Ne and a lean flag FLEAN.

At a step ST4, the CPU of the controller 2000 determines a value of the lean flag FLEAN, viz., determines whether the lean flag FLEAN is "1" or "0". The lean flag FLEAN is set to "1" when the present combustion condition of the engine 100 is being in the lean air-fuel mixture ratio of either the stratified charge combustion or the homogeneous charge combustion. The lean flag FLEAN is reset to "0" when the combustion condition of the engine 100 is being in the homogeneous stoichiometric air-fuel mixture ratio charge combustion.

At a step ST5, the CPU of the controller 2000 assigns a constant LRNALP (e.g., array name or address number) to a map header MAPHD so as to enable a retrieval of the learning value from a map storing the learning values on the air-fuel mixture ratio during the execution of purge of the vaporized fuel.

At a step ST6, the CPU of the controller 2000 retrieves (searches) the learning value KLBLRC from the map storing the learning value on the air-fuel (A/F) mixture ratio during the execution of the purge of the vaporized fuel on the basis of the engine speed Ne and the above-described fuel supply (injection) quantity Tib.

The learning value KLBLRC is used for correcting the variations in each device (engine) or deterioration over time.

Next, at a step ST7, the CPU of the controller 2000 assigns a constant BSLAP into the map header MAPHD so as to enable the retrieval of the learning value KLBLRC from the map storing the learning value on the air-fuel mixture ratio during no execution of the purge of the vaporized fuel. Hence, at the next step ST8, the CPU of the controller 2000 assigns the searched (retrieved) learning value KLBLRC into KLBLRC1 (the CPU of the controller 2000 sets the retrieved learning value KLBLRC as KLBLRC1, KLBLRC=KLBLRC1).

At a step ST9, the CPU of the controller 2000 determines whether the combustion condition is in the stratified lean air-fuel mixture ratio charge combustion or in the homogeneous lean air-fuel mixture ratio charge combustion according to a value of a stratified charge combustion switching flag FSTR.

It is noted that when the flag FSTR is set to "1", the present combustion condition is in the stratified charge combustion and when the flag FSTR is reset to "0", the present combustion condition is in the homogeneous charge combustion.

If the stratified charge combustion switching flag FSTR is set to "1" (YES) at the step ST9, the routine goes to a step ST10 since the CPU of the controller 2000 determines that the present combustion condition is in the stratified charge lean air-fuel mixture ratio charge combustion according to the value of "1" of the flag FLEAN at the step ST4 and to the value of "1" of the flag FSTR at the step ST9.

At the step ST10, the CPU of the controller 1000 assigns the output correction coefficient KHEVP into a predetermined value CSTREV below one so as to perform a correction of the output correction coefficient KHEVP to be limited to the predetermined value SCTREV below one.

Thereafter, the routine goes to a step ST12.

At the step ST12, the CPU of the controller 2000 compares the learning value KLBLRC0 during the execution of the purge of the vaporized fuel with the learning value KLBLRC1 during the non-execution of the purge of the vaporized fuel.

If KLBLRC1<KLBLRC0 at the step ST12 (Yes), the routing goes to a step ST14 in which the CPU of the controller 2000 assigns the learning value KLBLRC1 during no execution of the purge of the vaporized fuel into the learned value KLBLRC (KLBLRC=KLBLRC1 or expressed as KLBLRC←KLBLRC1).

If KLBLRC1≧KLBLRC0 at the step ST12 (No), the routine goes to a step ST15 in which the CPU of the controller 2000 selects one of the learning values KLBLRC0 or KLBLRC1 during the execution or no execution of the purge which is smaller than the other, viz., which renders the air-fuel mixture ratio leaner.

On the other hand, if the flag FSTR is reset to "0" (No), at the step ST9, the routine goes to a step ST11 in which an output correction coefficient KHVP is set to "1" and the routine goes to a step ST13. At the step ST13, the CPU of the controller 2000 compares the learning value KLBLRC0 during the execution of the purge with the learning value KLBLRC1 during no execution of the purge in the same manner as the step ST12.

If KLBLRC1<KLBLRC0 at the step ST13 (Yes), the routing goes to the step ST15 in which the CPU of the controller 2000 assigns the execution of the purge into the learned value KLBLRC (KLBLRC=KLBLRC0 or expressed as KLBLRC←KLBLRC0).

If KLBLRC1≧KLBLRC0 (No) at the step ST13, the routine goes to the step ST14 in which the CPU of the controller 2000 assigns the learning value KLBLRC1 during the no execution of the purge into the learning value KLBLRC (KLBLRC=KLBLRC1 or expressed as KLBLRC←KLBLRC0).

That is to say, during the combustion condition of the homogeneous lean air-fuel mixture ratio charge combustion, the CPU of the controller 2000 selects one of the learning value KLBLRC0 or KLBLRC1 during the execution or no execution of the purge which is larger than the other, viz., which renders the air-fuel mixture ratio richer.

Next, at a step ST16, the CPU of the controller 2000 calculates the fuel supply (injection) quantity Ti using the selected and retrieved learning value KLBLRC as follows:

Ti=Tib×KLBLRC×COEF+Ts, wherein COEF denotes various correction coefficients determined on the basis of a engine driving condition such as a coolant temperature and so forth and Ts denotes an ineffective injection quantity determined on the basis of a vehicular battery voltage of a vehicle in which the engine 100 shown in FIG. 13A is mounted.

At a step ST17, the CPU of the controller 2000 calculates an opening angle control value EVP of the purge control valve 1500 as follows: EVP=TEVP×KHEVP (or expressed as EVP=TEVP*KHEVP).

As described above, during the stratified lean air-fuel mixture ratio charge combustion, the CPU of the controller 2000 selects one of the two learning values which renders the air-fuel mixture ratio leaner, limiting a purge flow quantity through the purge control valve 1500. Consequently, a misfire due to the richened air-fuel mixture ratio can be prevented without failure.

In addition, during the homogeneous lean air-fuel mixture ratio charge combustion, the CPU of the controller 2000 selects one of the two learning values which renders the air-fuel mixture ratio leaner so that the misfire due to the leaned air-fuel mixture ratio can be prevented without failure.

Especially, since, in the third embodiment, in a case where an erroneous learning is carried out due to an occurrence of an abnormality in a purge control system constituted by the purge control valve 1500, the controller 2000 selects one of the learned values which is appropriate to each combustion mode so that a favorable air-fuel mixture control can be achieved.

Figure 14B:
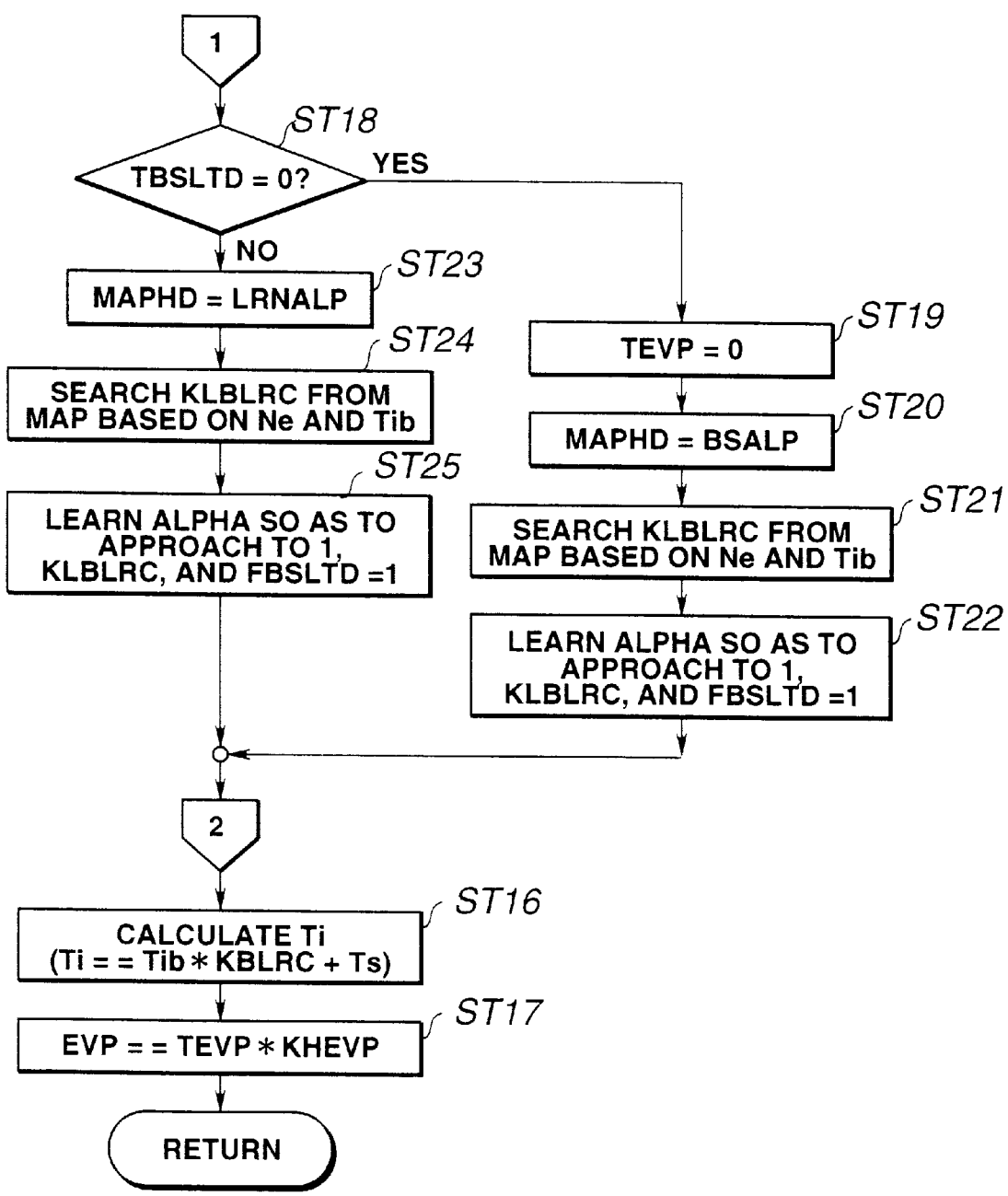

On the other hand, if the CPU of the controller 2000 determines that the present combustion condition is in the homogeneous stoichiometric air-fuel mixture ratio charge combustion not in the lean air-fuel mixture combustion (the flag FLEAN is "0") (No) at the step ST14, the routine goes to a step ST18 of FIG. 14B. Thereafter, respectively separate learnings on the air-fuel mixture ratio in the homogeneous stoichiometric air-fuel mixture ratio charge combustion according to the execution or no execution of the purge is carried out.

In details, at the step ST18, the CPU of the controller 2000 determines whether the learning of the air-fuel mixture ratio feedback correction coefficient ALPHA is converged according to a value of a learning convergence flag FBSLTD.

If the value of the learning convergence flag FBSLTD is "0", namely, if an air-fuel mixture feedback correction coefficient ALPHA is not converged and, hence, a condition to stop the purge of the vaporized fuel is satisfied (Yes) at the step ST18, the routine goes to a step ST19.

At the step ST19, the CPU of the controller 2000 sets the target opening angle control value TEVP of the purge control valve 1500 to 0 to stop the execution of the purge (TEVP=0).

Next, at a step ST20, the CPU of the controller 2000 assigns the constant BSALP into the map header MAPHD so as to enable the retrieval of the learning value from the map storing the learning value on the air-fuel mixture ratio during no execution of the purge of the vaporized fuel.

At the next step ST21, the CPU of the controller 2000 retrieves (searches) the learning value KLBRLC from the map storing the learning value of the air-fuel mixture ratio during no execution of the purge on the basis of the engine speed Ne and the other fuel supply (injection) quantity Tib.

At the step ST22, the CPU of the controller 2000 carries out the learning on the air-fuel mixture ratio so that the air-fuel mixture ratio feedback correction coefficient ALPHA approaches to a reference value (for example, one) so as to update the learning value KLBLRC.

It is noted that during the learning described above, the purge is not executed and the present learning value KLBLRC is stored so as to update the previously stored learning value in a memory area exclusively used during no execution of the purge.

In addition, the learning convergence flag FBSTLTD is set to "1" when the CPU of the controller 2000 determines that the convergence of the learning of the feedback correction coefficient ALPHA is carried out.

Next, the routine goes from the step ST22 to the step ST16.

At the step ST16, the CPU of the controller 2000 calculates the final fuel (supply) injection quantity Ti using the learning value KRBLRC during the no execution of the purge.

At the next step ST17, the CPU of the controller 2000 calculates the opening angle control value EVP of the purge control valve 1500. Since the target opening angle control valve TEVP is set to "0" at the step ST19, the opening angle control purge is maintained at the stop state.

On the other hand, if the learning of the coefficient ALPHA is converged at the step ST18 (No), the routing goes to a step ST23 in which the CPU of the controller 2000 assigns the constant LRNALP into the map header MAPHD so as to enable the retrieval of the learning value from the map storing the learning valve on the air-fuel mixture ratio during the execution of the purge of the vaporized fuel.

At a step ST24, the CPU of the controller 2000 retrieves the learning value KLBLRC from the map storing the learning value on the air-fuel mixture ratio during the execution of the purge on the basis of the engine speed Ne and the other fuel supply (injection) quantity Tib.

At a step ST25, the CPU of the controller 2000 carries out the learning on the air-fuel mixture ratio in the same way as described above so as to update the learning value KLBLRC.

It is noted that during the learning on the air-fuel mixture ratio at the step ST25, the purge of the vaporized fuel is carried out and the present learning value KLBLRC is stored so as to update the previous learning value stored in a memory area exclusively used during the execution of the purge.

Then, the routine goes from the step ST25 to the step ST16 in which the fuel supply (injection) quantity Ti is calculated using the learning value KLBLRC during the execution of the purge.

Thereafter, the routine goes to the step ST17 in which the CPU of the controller 2000 calculates the opening angle control value EVP of the purge control valve 1500.

It is noted that FIG. 15 shows the map representing the target purge control value TEVP with respect to the engine driving condition, namely, the engine speed Ne and the engine load such as the accelerator depression angle APS (ACC) or the basic fuel supply (injection) quantity Tp, FIG. 16 shows the map representing the switching of the three combustion conditions with respect to the engine speed Ne and the engine load such as APS or Tp, and the maps described in the third embodiment are stored in a memory such as the ROM shown in FIG. 13B.

What is claimed is:

1. A control system for an internal combustion engine, comprising:
    a first air-fuel ratio control system for controlling an air-fuel ratio of air-fuel mixture to be formed in the engine, during a first mode engine operation around stoichiometric air-fuel ratio, said first air-fuel ratio control system including
        a section for calculating a basic fuel supply quantity in accordance with an intake air quantity of air to be charged in a cylinder of the engine,
        a section for detecting an air-fuel ratio by providing first and second value signals which correspond respectively to rich and lean air-fuel ratios of the air-fuel mixture to be formed in the engine, relative to stoichiometric air-fuel ratio,
        a section for setting an air-fuel ratio feedback correction value in accordance with the air-fuel ratio detected by said air-fuel ratio detecting section, said air-fuel ratio feedback correction value being for correcting said basic fuel supply quantity to cause an actual air-fuel ratio to approach vicinity of stoichiometric air-fuel ratio,
        a section for storing an air-fuel ratio correction learning valve to be changeable in each of a plurality of engine operating regions which are formed by dividing an operating range of the engine in accordance with a fuel supply quantity of fuel to be supplied to the engine, said air-fuel ratio correction learning value being for correcting said basic fuel supply quantity,
        a section for learning the air-fuel ratio by updating and setting said air-fuel ratio correction learning value stored by said air-fuel ratio correction learning value storing section, for each engine operating region in a manner to decrease a deviation of said air-fuel ratio correction value from a standard value of said air-fuel ratio feedback correction value corresponding to said engine operating region,
        a section for setting a final value of said fuel supply quantity for the first mode engine operation in accordance with said basic fuel supply quantity, said air-fuel ratio feedback correction value and said air-fuel ratio correction learning value, and
        a section for driving a fuel supply device in accordance with said final value of said fuel supply quantity for the first mode engine operation set by said fuel supply quantity setting section; and
    a second air-fuel ratio control system for controlling the air-fuel ratio during a second mode engine operation at lean air-fuel ratio, said second air-fuel ratio control system including
        a section for calculating said fuel supply quantity under said second mode engine operation, in accordance with said intake air quantity to be charged into the cylinder, and a target air-fuel ratio,
        a section for searching said air-fuel ratio correction learning value storing section through said fuel supply quantity for said second mode engine operation to obtain said air-fuel ratio correction learning value,
        a section for setting a final value of said fuel supply quantity for said second mode engine operation in accordance with said air-fuel ratio correction learning value obtained by said learning value searching section and said fuel supply quantity for said second mode engine operation, and
        a section for driving said fuel supply device in accordance with said final value of said fuel supply quantity set by said fuel supply quantity setting section for said second mode engine operation.

2. A control system as claimed in claim 1, wherein said fuel supply quantity calculating section for the second mode operation includes a section for calculating said fuel supply quantity by multiplying said intake air quantity to be charged into the cylinder by said target air-fuel ratio.

3. A control system as claimed in claim 1, wherein said fuel supply quantity setting section for the second mode engine operation includes a section for calculating said final value of said fuel supply quantity for said second mode engine operation in accordance with said air-fuel ratio correction learning value obtained by said learning value searching section, said intake air quantity of air to be charged in the cylinder, and said target air-fuel ratio.

4. A control system as claimed in claim 1, wherein the plurality of engine operating regions correspond to said fuel supply quantity excluding said air-fuel ratio feedback correction value and said air-fuel ratio correction learning value.

5. A method of controlling an internal combustion engine, comprising:
    a first air-fuel ratio control process for controlling an air-fuel ratio of air-fuel mixture to be formed in the engine, during a first mode engine operation around stoichiometric air-fuel ratio, the first air-fuel ratio control process including the following steps:
        calculating a basic fuel supply quantity in accordance with an intake air quantity of air to be charged in a cylinder of the engine, detecting an air-fuel ratio by providing first and second value signals which correspond respectively to rich and lean air-fuel ratios of the air-fuel mixture to be formed in the engine, relative to stoichiometric air-fuel ratio, setting an air-fuel ratio feedback correction value in accordance with the detected air-fuel ratio, the air-fuel ratio feedback correction value being for correcting the basic fuel supply quantity to cause an actual air-fuel ratio to approach vicinity of stoichiometric air-fuel ratio, storing an air-fuel ratio correction learning value to be changeable in each of a plurality of engine operating regions which are formed by dividing an operating range of the engine in accordance with a fuel supply quantity of fuel to be supplied to the engine, the air-fuel ratio correction learning value being for correcting the basic fuel supply quantity, learning the air-fuel ratio by updating and setting the air-fuel ratio correction learning value stored by the air-fuel ratio correction learning value storing section, for each engine operating region in a manner to decrease a deviation of the air-fuel ratio correction value from a standard value of the air-fuel ratio feedback correction value corresponding to the engine operating region, setting a final value of the fuel supply quantity for the first mode engine operation in accordance with the basic fuel supply quantity, the air-fuel ratio feedback correction value and the air-fuel ratio correction learning value, and driving a fuel supply device in accordance with the set final value of the fuel supply quantity for the first mode engine operation; and a second air-fuel ratio control process for controlling the air-fuel ratio during a second mode engine operation at lean air-fuel ratio, the second air-fuel ratio control process including the following steps:

calculating the fuel supply quantity under the second mode engine operation, in accordance with the intake air quantity to be charged into the cylinder, and a target air-fuel ratio, searching the air-fuel ratio correction learning value storing section through the fuel supply quantity for the second mode engine operation to obtain the air-fuel ratio correction learning value, setting a final value of the fuel supply quantity for the second mode engine operation in accordance with the obtained air-fuel ratio correction learning value and the fuel supply quantity for the second mode engine operation, and driving the fuel supply device in accordance with the set final value of the fuel supply quantity for the second mode engine operation.

6. A method as claimed in claim 5, wherein the fuel supply quantity calculating step for the second mode operation includes the step of calculating the fuel supply quantity by multiplying the intake air quantity to be charged into the cylinder by the target air-fuel ratio.

7. A method as claimed in claim 5, wherein the fuel supply quantity setting step for the second mode engine operation includes the step of calculating the final value of the fuel supply quantity for the second mode engine operation in accordance with the air-fuel ratio correction learning value obtained by the learning value searching section, the intake air quantity of air to be charged in the cylinder, and the target air-fuel ratio.

8. A method as claimed in claim 5, wherein the plurality of engine operating regions correspond to the fuel supply quantity excluding the air-fuel ratio feedback correction value and the air-fuel ratio correction learning value.

9. A control apparatus for an internal combustion engine, comprising:

a fuel injector disposed in the engine;

a detector that detects an air-fuel ratio, the detector being disposed in an exhaust gas passage of the engine; and a controller that drives the fuel injector in accordance with a final fuel supply quantity, wherein the controller being programmed to determine the final fuel supply quantity for a first mode engine operation including:

calculate a basic fuel supply quantity based on an intake air quantity charged into a cylinder;

set an air-fuel ratio feedback correction value which bring the air fuel ratio to a first target air-fuel ratio for the first mode engine operation;

store an air-fuel ratio correction learning value in each engine operating region divided in accordance with a fuel supply quantity to be supplied to the engine, the air-fuel ratio correction learning value being for correcting the basic fuel supply quantity;

update the air-fuel ratio correction learning value of each engine operating region in a manner to decrease a deviation of the air-fuel ratio correction value from a standard value; and determined the final fuel supply quantity based on the basic fuel supply quantity, the air fuel ratio feedback correction value and the air-fuel ratio correction learning value;

wherein the controller being programmed to determine the final fuel supply quantity for a second mode engine operation, including:

calculated the fuel supply quantity to be supplied for the second mode engine operation based on the intake air quantity charged into the cylinder and a second target air-fuel ratio for the second mode engine operation;

look up the air-fuel ratio correction learning value through the fuel supply quantity for the second mode engine operation; and determine the final fuel supply quantity based on the air-fuel ratio correction learning value looked up through the fuel supply quantity for the second mode engine operation and the fuel supply quantity for the second mode engine operation.

10. A control apparatus as claimed in claim 9, wherein the fuel supply quantity to be supplied for the second mode engine operation is calculated by multiplying the intake air quantity charged into the cylinder by the second target air-fuel ratio for the second mode engine operation.

11. A control apparatus as claimed in claim 9, wherein the engine operating region divided in accordance with the fuel supply quantity to be supplied to the engine excludes the air-fuel ratio feedback correction value and the air-fuel ratio correction learning value.

12. A control apparatus as claimed in claim 9, wherein the first target air-fuel ratio for the first mode engine operation is a stoichiometric air-fuel ratio.

13. A control apparatus as claimed in claim 9, wherein the second target air-fuel ratio for the second mode engine operation is a lean air-fuel ratio.

14. A method of controlling an internal combustion engine, comprising:

detecting an air-fuel ratio with a detector disposed in an exhaust gas passage of the engine, a fuel injector being disposed in the engine; and programming a controller that drives the fuel injector in accordance with a final fuel supply quantity to determine the final supply quantity for a first mode engine operation, the programming including the following steps:
  calculating a basic fuel supply quantity based on an intake air quantity charged into a cylinder;
  setting an air-fuel ratio feedback correction value which bring the air fuel ratio to a first target air-fuel ratio for the first mode engine operation;
  storing an air-fuel ratio correction learning value in each engine operating region divided in accordance with a fuel supply quantity to be supplied to the engine, the air-fuel ratio correction learning value being for correcting the basic fuel supply quantity;
  updating the air-fuel ratio correction learning value of each engine operating region in a manner to decrease a deviation of the air-fuel ratio correction value from a standard value; and
  determining the final fuel supply quantity based on the basic fuel supply quantity, the air fuel ratio feedback correction value and the air-fuel ratio correction learning value;
programming the controller to determine the final fuel supply quantity for a second mode engine operation by including the following steps:
  calculating the fuel supply quantity to be supplied for the second mode engine operation based on the intake air quantity charged into the cylinder and a second target air-fuel ratio for the second mode engine operation;
  looking up the air-fuel ratio correction learning value through the fuel supply quantity for the second mode engine operation; and
  determining the final fuel supply quantity based on the air-fuel ratio correction learning value looked up through the fuel supply quantity for the second mode engine operation and the fuel supply quantity for the second mode engine operation.

15. A control method as claimed in claim 14, wherein the fuel supply quantity to be supplied for the second mode engine operation is calculated by multiplying the intake air quantity charged into the cylinder by the second target air-fuel ratio for the second mode engine operation.

16. A control method as claimed in claim 14, wherein the engine operating region divided in accordance with the fuel supply quantity to be supplied to the engine excludes the air-fuel ratio feedback correction value and the air-fuel ratio correction learning value.

17. A control method as claimed in claim 14, wherein the first target air-fuel ratio for the first mode engine operation is a stoichiometric air-fuel ratio.

18. A control method as claimed in claim 14, wherein the second target air-fuel ratio for the second mode engine operation is a lean air-fuel ratio.

* * * * *